United States Patent
Nishimaki et al.

(10) Patent No.: US 9,858,643 B2
(45) Date of Patent: Jan. 2, 2018

(54) IMAGE GENERATING DEVICE, IMAGE GENERATING METHOD, AND PROGRAM

(71) Applicant: Sony Computer Entertainment Inc., Tokyo (JP)

(72) Inventors: Yoichi Nishimaki, Kanagawa (JP); Takeshi Yamagishi, Kanagawa (JP); Shinichi Hirata, Kanagawa (JP); Kyoko Furumura, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 97 days.

(21) Appl. No.: 14/813,605

(22) Filed: Jul. 30, 2015

(65) Prior Publication Data

US 2016/0086306 A1    Mar. 24, 2016

(30) Foreign Application Priority Data

Sep. 19, 2014  (JP) ................. 2014-191775

(51) Int. Cl.
| | |
|---|---|
| G06T 3/40 | (2006.01) |
| H04N 5/232 | (2006.01) |
| G02B 27/01 | (2006.01) |
| G06T 11/00 | (2006.01) |

(52) U.S. Cl.
CPC .............. *G06T 3/40* (2013.01); *G02B 27/017* (2013.01); *G06T 11/00* (2013.01); *H04N 5/23238* (2013.01); *H04N 5/23261* (2013.01); *H04N 5/23293* (2013.01); *G06T 2210/22* (2013.01)

(58) Field of Classification Search
CPC ....... G06T 3/40; G06T 11/00; G06T 2210/22; H04N 5/23293; H04N 5/23261; H04N 5/23238; G02B 27/017
See application file for complete search history.

(56) References Cited

U.S. PATENT DOCUMENTS

| | | | |
|---|---|---|---|
| 2003/0142115 A1* | 7/2003 | Endo ..................... | G09B 29/10 345/633 |
| 2004/0174386 A1* | 9/2004 | Kotake ................ | G06T 15/205 345/633 |
| 2009/0135178 A1* | 5/2009 | Aihara ................. | G06T 15/205 345/419 |
| 2010/0123737 A1* | 5/2010 | Williamson ....... | G01C 21/3647 345/672 |

\* cited by examiner

*Primary Examiner* — Ke Xiao
*Assistant Examiner* — Kim-Thanh T Tran
(74) *Attorney, Agent, or Firm* — Katten Muchin Rosenman LLP

(57) ABSTRACT

An image generating device includes: a storage section that stores images of surrounding spaces centered at plural different fixed points; a detecting section that detects translational movement on the basis of the location of the point of view; an image processor that acquires an image of a displaying target by clipping out part of the image of the surrounding space centered at the fixed point, stored in the storage section, on the basis of the location of the point of view and the direction of the line of sight; and a switching section that makes switching to the image of the surrounding space centered at another fixed point closest to the point of view after translational movement if the plural different fixed points are so disposed that the surrounding spaces centered at the fixed points overlap with each other in a world coordinate system and translational movement is detected.

7 Claims, 20 Drawing Sheets

FIG.3
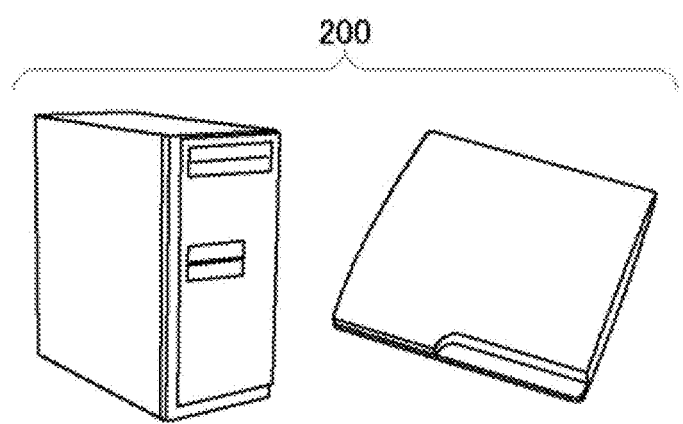
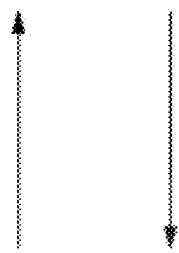

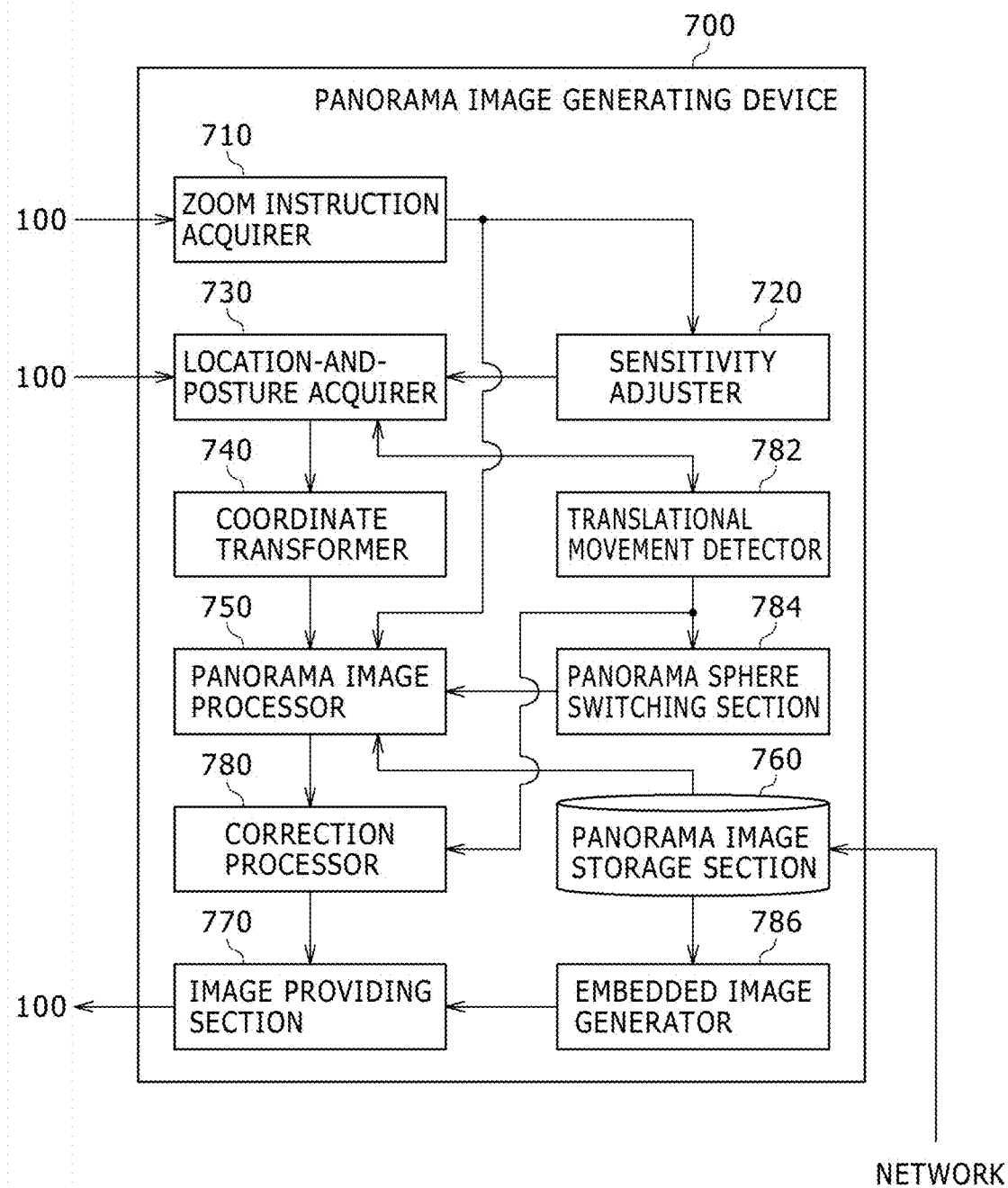

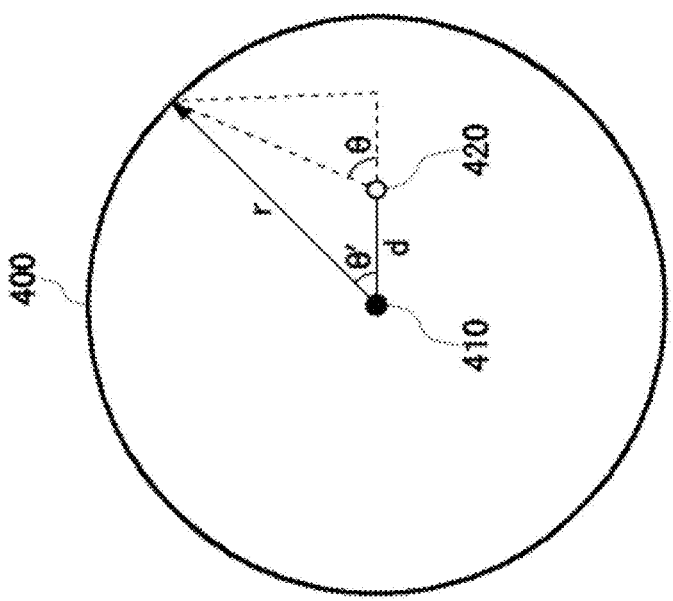
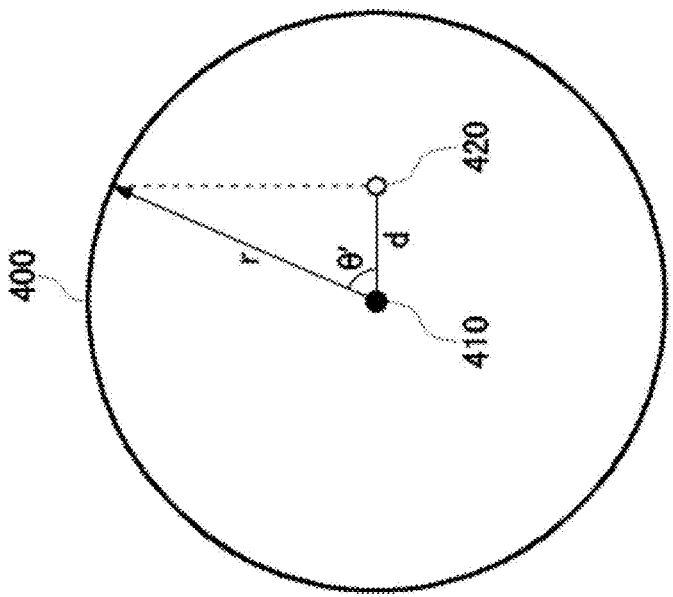

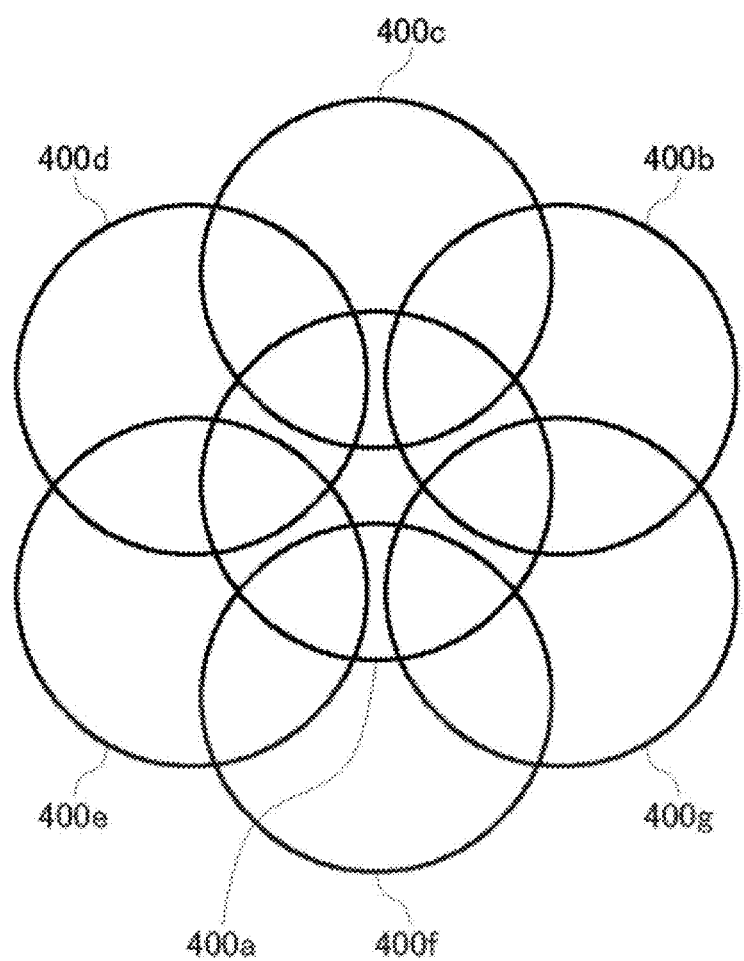
F I G . 1 2

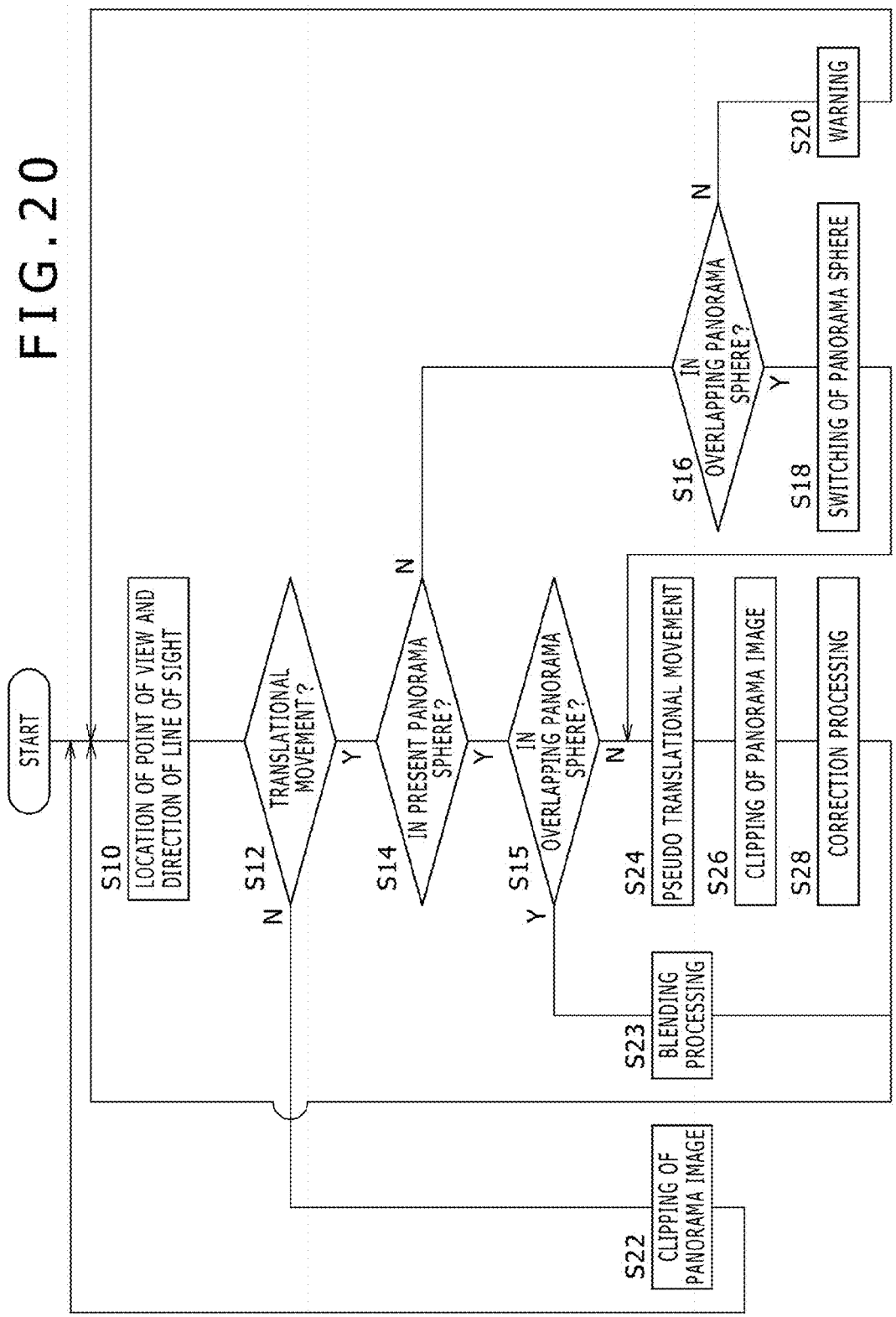

IMAGE GENERATING DEVICE, IMAGE GENERATING METHOD, AND PROGRAM

BACKGROUND

This disclosure relates to a device, a method and a program to generate a wide viewing angle image such as a panorama image.

Special shooting equipment is required thus far to shoot 360-degree panorama still images and panorama moving images. However, recently cameras capable of shooting omnidirectional panorama images have come to be sold for general consumers. Furthermore, a site that accepts posting of omnidirectional panorama images shot by users and opens the images to the public by the Internet and a service to distribute 360-degree panorama video via a network are also used.

There is also a system in which panorama video is displayed on a head-mounted display and a panorama image according to the direction of the line of sight is displayed when a user who wears the head-mounted display rotates the head. It is also possible to enhance the feeling of being immersed in the video and improve the operability of applications of games and so forth by utilizing the head-mounted display. Furthermore, there has also been developed a walk-through system in which a user who wears a head-mounted display can virtually walk around in a space displayed as video by physically moving.

SUMMARY

Generally, a panorama image is obtained by performing shooting continuously or in plural times while a camera is panned in the horizontal direction and/or the vertical direction, with the location of the camera fixed. Alternatively, the panorama image is obtained by one shot, with plural cameras disposed in different directions around the point of view. In either case, the location of the point of view is fixed. When the direction of the line of sight is specified on a panorama image obtained by shooting a space around the point of view, an image in sight in this direction can be clipped out. However, in the case of the panorama image, it is not assumed that the location of the point of view moves and therefore it may be impossible to provide an image that is in sight when a user translationally moves in a space obtained by panorama shooting to move the point of view. This is particularly disadvantageous in implementing a walk-through system, in which a user who wears a head-mounted display moves in a panorama space.

It is desirable to provide an image generating device, an image generating method and a program that allow the movement of the location of the point of view with respect to a wide viewing angle image such as a panorama image.

According to an embodiment of the present disclosure, there is provided an image generating device including a storage section configured to store images of surrounding spaces centered at a plurality of different fixed points, a detecting section configured to detect translational movement on the basis of the location of the point of view, and an image processor configured to acquire an image of a displaying target by clipping out part of the image of the surrounding space centered at the fixed point, stored in the storage section, on the basis of the location of the point of view and the direction of the line of sight. The image generating device further includes a switching section configured to make switching to the image of the surrounding space centered at another fixed point closest to the point of view after translational movement if the plurality of different fixed points are so disposed that the surrounding spaces centered at the fixed points overlap with each other in a world coordinate system in which the point of view moves and translational movement is detected by the detecting section.

According to another embodiment of the present disclosure, there is provided an image generating method including detecting translational movement on the basis of the location of the point of view and acquiring an image of a displaying target by clipping out, from a memory that stores images of surrounding spaces centered at a plurality of different fixed points, part of the image of the surrounding space centered at the fixed point on the basis of the location of the point of view and the direction of the line of sight. The image generating method further includes making switching to the image of the surrounding space centered at another fixed point closest to the point of view after translational movement if the plurality of different fixed points are so disposed that the surrounding spaces centered at the fixed points overlap with each other in a world coordinate system in which the point of view moves and translational movement is detected by the detecting.

According to a further embodiment of the present disclosure, there is provided a program for a computer, the program including detecting translational movement on the basis of the location of the point of view and acquiring an image of a displaying target by clipping out, from a memory that stores images of surrounding spaces centered at a plurality of different fixed points, part of the image of the surrounding space centered at the fixed point on the basis of the location of the point of view and the direction of the line of sight. The program further includes making switching to the image of the surrounding space centered at another fixed point closest to the point of view after translational movement if the plurality of different fixed points are so disposed that the surrounding spaces centered at the fixed points overlap with each other in a world coordinate system in which the point of view moves and translational movement is detected by the detecting.

What are obtained by translating arbitrary combinations of the above constituent elements and expressions of the present disclosure among method, device, system, computer program, data structure, recording medium, and so forth are also effective as embodiments of the present disclosure.

According to the embodiments of the present disclosure, the location of the point of view can be moved with respect to a wide viewing angle image such as a panorama image.

BRIEF DESCRIPTION OF THE DRAWINGS

FIG. 3 is a configuration diagram of a panorama image generating system according to an embodiment of the present disclosure;

FIG. 4 is a functional configuration diagram of a panorama image generating device according to the embodiment;

FIGS. 8A and 8B are diagrams for explaining pseudo translational movement;

FIG. 12 is a diagram showing plural panorama spheres overlapping with each other;

FIG. 20 is a flowchart for explaining the procedure of panorama image generation by the panorama image generating device of the embodiment.

DETAILED DESCRIPTION OF THE PREFERRED EMBODIMENT

Figure 1:
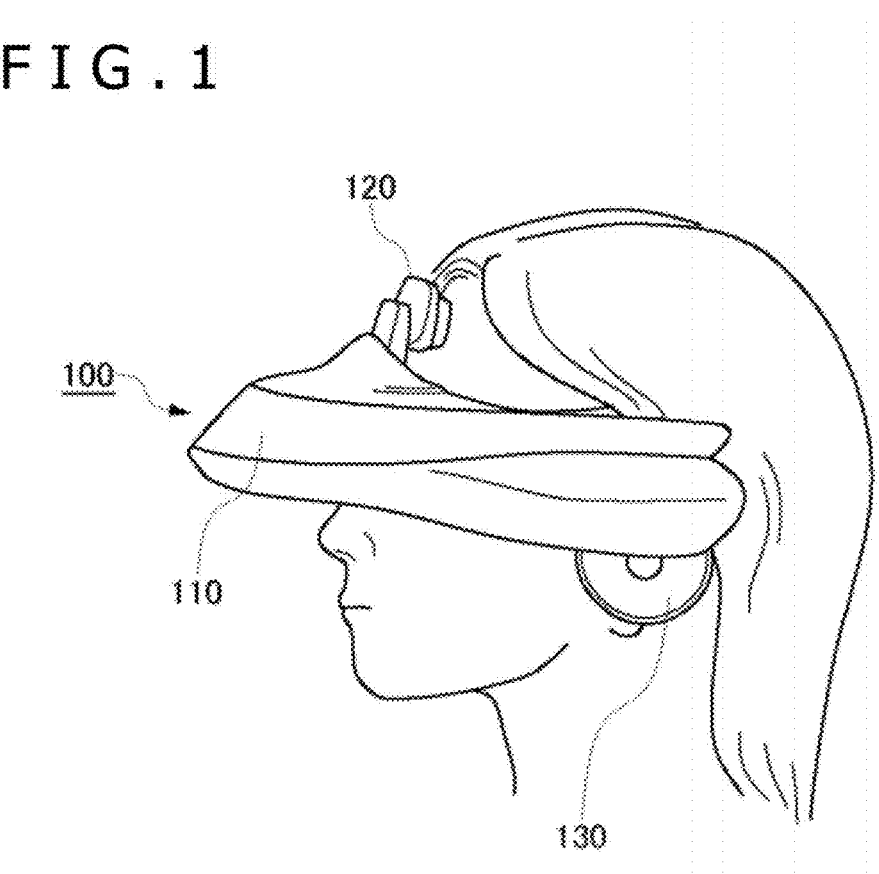
FIG. 1 is an appearance diagram of a head-mounted display.

FIG. 1 is an appearance diagram of a head-mounted display 100. The head-mounted display 100 includes a main body unit 110, a forehead contact portion 120, and a temporal contact portion 130.

The head-mounted display 100 is a display device mounted on the head of a user to watch still images, moving images, and so forth displayed on a display and listen to sounds, music, and so forth output from a headphone.

Posture information such as the rotational angle and tilt of the head of the user who wears the head-mounted display 100 can be measured by a posture sensor provided as a built-in component or an external component of the head-mounted display 100.

Here, a method of generating an image displayed on the head-mounted display 100 will be described. However, the image generating method of the present embodiment can be applied not only to the head-mounted display 100 in a narrow sense but also to a case in which a user wears glasses, glasses-type display, glasses-type camera, headphone, headset (microphone-equipped headphone), earphone, earring, ear-hook camera, hat, camera-equipped hat, hair band, etc.

Figure 2:
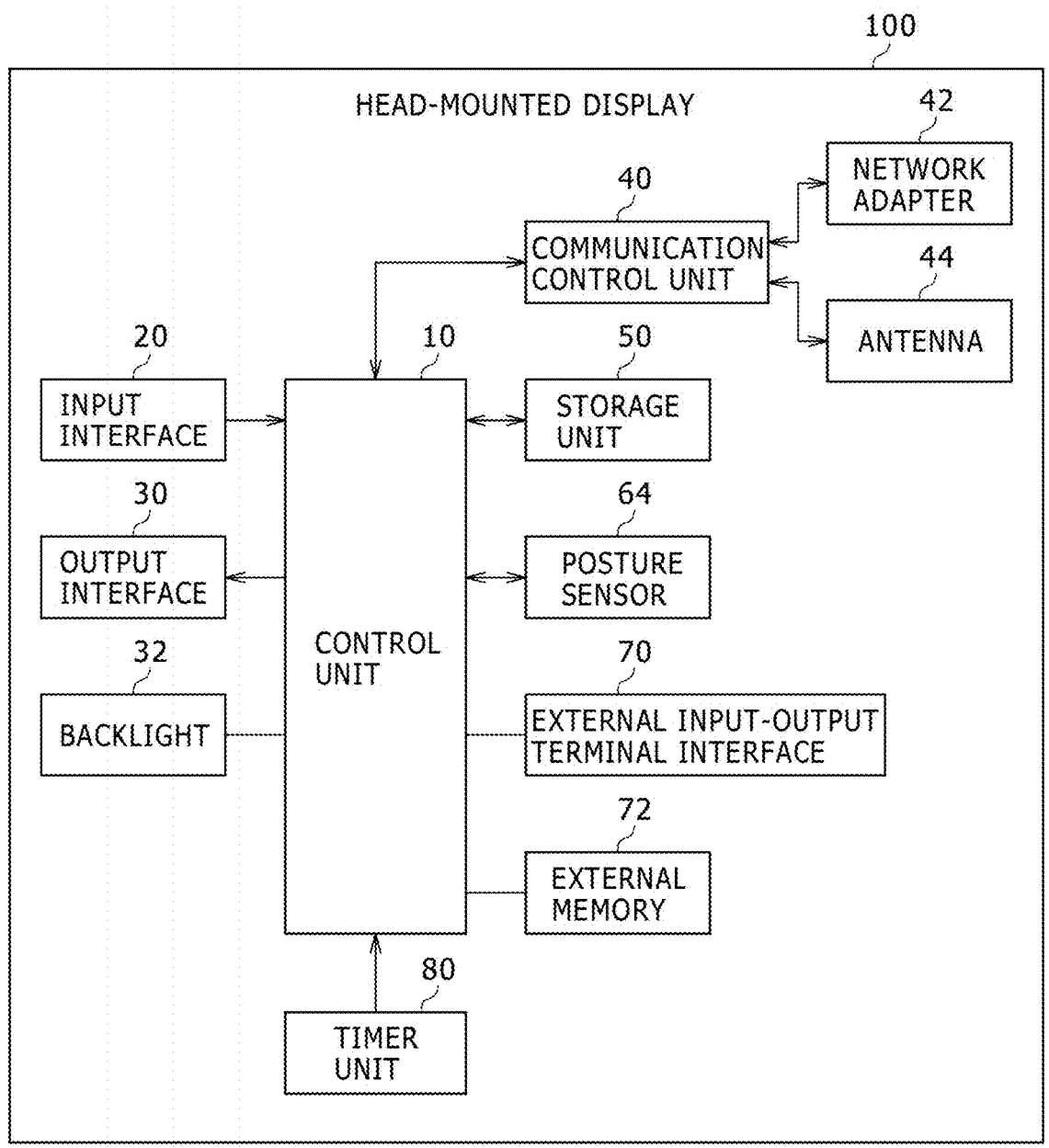
FIG. 2 is a functional configuration diagram of the head-mounted display.

FIG. 2 is a functional configuration diagram of the head-mounted display 100.

A control unit 10 is a main processor that processes and outputs signals such as an image signal and a sensor signal, commands, and data. An input interface 20 accepts an operation signal and a setting signal from a user and supplies the accepted signals to the control unit 10. An output interface 30 receives an image signal from the control unit 10 and causes an image to be displayed on the display. A backlight 32 supplies backlight to a liquid crystal display.

A communication control unit 40 transmits data input from the control unit 10 to the external by wired or wireless communications via a network adapter 42 or an antenna 44. Furthermore, the communication control unit 40 receives data from the external by wired or wireless communications via the network adapter 42 or the antenna 44 and outputs the data to the control unit 10.

A storage unit 50 temporarily stores data, parameter, operation signal, and so forth to be processed by the control unit 10.

A posture sensor 64 detects posture information such as the rotational angle and tilt of the main body unit 110 of the head-mounted display 100. The posture sensor 64 is implemented by combining a gyro sensor, an acceleration sensor, an angular velocity sensor, and so forth as appropriate.

An external input-output terminal interface 70 is an interface configured to connect peripheral equipment such as a universal serial bus (USB) controller. An external memory 72 is an external memory such as a flash memory.

A timer unit 80 sets time information on the basis of a setting signal from the control unit 10 and supplies time data to the control unit 10.

The control unit 10 can supply an image or text data to the output interface 30 to cause it to be displayed on the display, or supply an image or text data to the communication control unit 40 to cause it to be transmitted to the external.

FIG. 3 is a configuration diagram of a panorama image generating system according to the present embodiment. The head-mounted display 100 is connected to a game machine 200 by wireless communications or an interface to connect peripheral equipment, such as a USB interface. The game machine 200 may be further connected to a server via a network. In this case, the server may provide the game machine 200 with an online application of a game or the like in which plural users can participate via the network. The head-mounted display 100 may be connected to a computer or a portable terminal instead of the game machine 200.

A panorama image displayed on the head-mounted display 100 may be an artificial panorama image like a game space besides a 360-degree panorama still image or panorama moving image shot in advance. Furthermore, live video of a remote place distributed via a network may be displayed.

FIG. 4 is a functional configuration diagram of a panorama image generating device 700 according to the present embodiment. FIG. 4 represents a block diagram drawn with focus on functions. These functional blocks can be implemented in various forms by only hardware, or only software, or a combination of hardware and software.

The panorama image generating device 700 is implemented in the game machine 200 to which the head-mounted display 100 is connected. However, at least part of the functions of the panorama image generating device 700 may be implemented in the control unit 10 of the head-mounted display 100. Alternatively, at least part of the functions of the panorama image generating device 700 may be implemented in a server connected to the game machine 200 via a network.

A zoom instruction acquirer 710 acquires the magnification of zoom ordered by a user via the input interface 20 of the head-mounted display 100. The zoom magnification acquired by the zoom instruction acquirer 710 is supplied to a sensitivity adjuster 720 and a panorama image processor 750.

A location-and-posture acquirer 730 acquires the location and posture of the head of a user who wears the head-mounted display 100 on the basis of location information detected by a motion sensor of the head-mounted display 100 and posture information detected by the posture sensor 64. The location of the head of the user may be acquired by detecting a motion of the head-mounted display 100 by a camera of the game machine 200.

The location-and-posture acquirer 730 acquires the location and posture of the head of the user on the basis of sensitivity prescribed from the sensitivity adjuster 720. For example, when the user rotates the head, a change in the angle of the head of the user is detected by the posture sensor 64. However, the sensitivity adjuster 720 instructs the location-and-posture acquirer 730 to ignore the detected change in the angle until the change in the angle surpasses a predetermined value.

Furthermore, the sensitivity adjuster 720 adjusts the sensitivity of the angle detection of the head on the basis of the zoom magnification acquired from the zoom instruction acquirer 710. When the zoom magnification is higher, the sensitivity of the angle detection of the head is set lower. Because zooming decreases the angle of view, the vibration of a displayed image due to the fluctuation of the head can be suppressed by lowering the sensitivity of the angle detection of the head.

The motion of the head of the user in the front-rear, left-right, and upward-downward directions may be detected by using, as a motion sensor, a combination of at least one of a three-axis geomagnetic sensor, a three-axis acceleration sensor, and a three-axis gyro (angular velocity) sensor. Furthermore, the accuracy of the motion detection of the head may be improved by combining the location information of the head of the user.

A coordinate transformer 740 performs coordinate transformation for generating an image to be displayed on the head-mounted display 100 on the basis of the posture of the head-mounted display 100 acquired by the location-and-posture acquirer 730.

The panorama image processor 750 reads out panorama image data from a panorama image storage section 760. Then, in accordance with coordinate transformation by the coordinate transformer 740, the panorama image processor 750 generates a panorama image according to the location and posture of the head-mounted display 100 at a zoom magnification prescribed from the zoom instruction acquirer 710 and gives the panorama image to a correction processor 780. The panorama image data may be moving image or still image content created in advance or may be computer graphics obtained by rendering. Furthermore, a panorama image shot at a remote place may be received via a network and stored in the panorama image storage section 760.

In the panorama image storage section 760, plural kinds of panorama images are stored. The panorama image is one example of an image of a surrounding space centered at a fixed point. In the case of the panorama image of the whole celestial sphere, the surrounding space (panorama space) is represented by a sphere. This sphere will be referred to as the "panorama sphere" and the center of the sphere will be referred to as the "panorama center."

In the present embodiment, the coordinates of the center of a panorama sphere and the radius thereof are settled in a world coordinate system. Plural panorama spheres are disposed in the world coordinate system, with the orientation aligned among the panorama spheres. A user who wears the head-mounted display 100 can virtually walk through the panorama space in the world coordinate system by physically moving while viewing an image of the panorama sphere by the display. In the world coordinate system, the user can remain in one panorama sphere and can move from a certain panorama sphere to another panorama sphere. The panorama sphere in which the user remains at the present timing will be referred to as the "present panorama sphere."

A translational movement detector 782 detects translational movement of the user on the basis of the location of the head-mounted display 100 acquired by the location-and-posture acquirer 730. The translational movement detector 782 supplies information relating to translational movement to a panorama sphere switching section 784 and the correction processor 780. The direction and distance of translational movement are included in the information relating to the translational movement.

Furthermore, in order to implement translational movement in a pseudo manner, the translational movement detector 782 converts the rotational angle of the line of sight at the location of the point of view after translational movement of the user to a rotational angle about the center of the present panorama sphere. This rotational angle after the conversion will be referred to as the "pseudo rotational angle." The pseudo rotational angle can be obtained from the translational movement distance and the rotational angle of the line of sight at the location after the translational movement. The translational movement detector 782 supplies information on the pseudo rotational angle to the coordinate transformer 740.

The panorama sphere switching section 784 determines whether or not the location of the point of view of the user has gotten out of the present panorama sphere due to translational movement. If the location of the point of view of the user does not exist in the present panorama sphere but exist in another panorama sphere, the panorama sphere switching section 784 instructs the panorama image processor 750 to switch the panorama sphere of the processing target. The panorama image processor 750 switches the panorama sphere of the processing target from the present panorama sphere to the other panorama sphere and reads out the panorama image data of the other panorama sphere from the panorama image storage section 760. Then, in accordance with coordinate transformation by the coordinate transformer 740, the panorama image processor 750 generates a panorama image according to the posture of the head-mounted display 100 from the panorama sphere of the processing target.

If acquiring the information on the pseudo rotational angle from the translational movement detector 782, the coordinate transformer 740 deems that the head-mounted display 100 is oriented in the direction of the pseudo rotational angle at the center of the panorama sphere of the processing target and performs coordinate transformation for generating an image to be displayed on the head-mounted display 100.

In order to implement pseudo translational movement, the correction processor 780 executes processing of correcting distortion on the panorama image generated by the panorama image processor 750 according to the translational movement distance acquired from the translational movement detector 782. The correction processor 780 gives the panorama image for which the correction processing is executed in this manner to an image providing section 770. If the translational movement detector 782 does not detect translational movement or the detected translational movement distance is sufficiently short and the correction processing is unnecessary, the correction processor 780 skips the correction processing and gives the image providing section 770 the panorama image generated by the panorama image processor 750 as it is.

An embedded image generator 786 generates an image of a panorama sphere that is so disposed as to overlap with the present panorama sphere (referred to as the "overlapping panorama sphere") as an embedded image in order to synthesize the embedded image with the panorama image that is generated by the panorama image processor 750 and corrected by the correction processor 780 as appropriate. The generation of the embedded image is optional and thus is skipped if it is unnecessary. The embedded image generator 786 supplies the generated embedded image to the image providing section 770 together with information on the embedding position in the panorama image. The embedded image generator 786 may generate the embedded image by blending an image of the present panorama sphere with an image of an overlapping panorama sphere.

The image providing section 770 supplies, to the head-mounted display 100, the panorama image data that is generated by the panorama image processor 750 and corrected by the correction processor 780 as appropriate. If receiving supply of an embedded image from the embedded image generator 786, the image providing section 770 supplies the panorama image data obtained by synthesizing the embedded image at a specified embedding position in the panorama image to the head-mounted display 100.

The operation of the panorama image generating device 700 of the present embodiment will be described below.

Figure 5A:
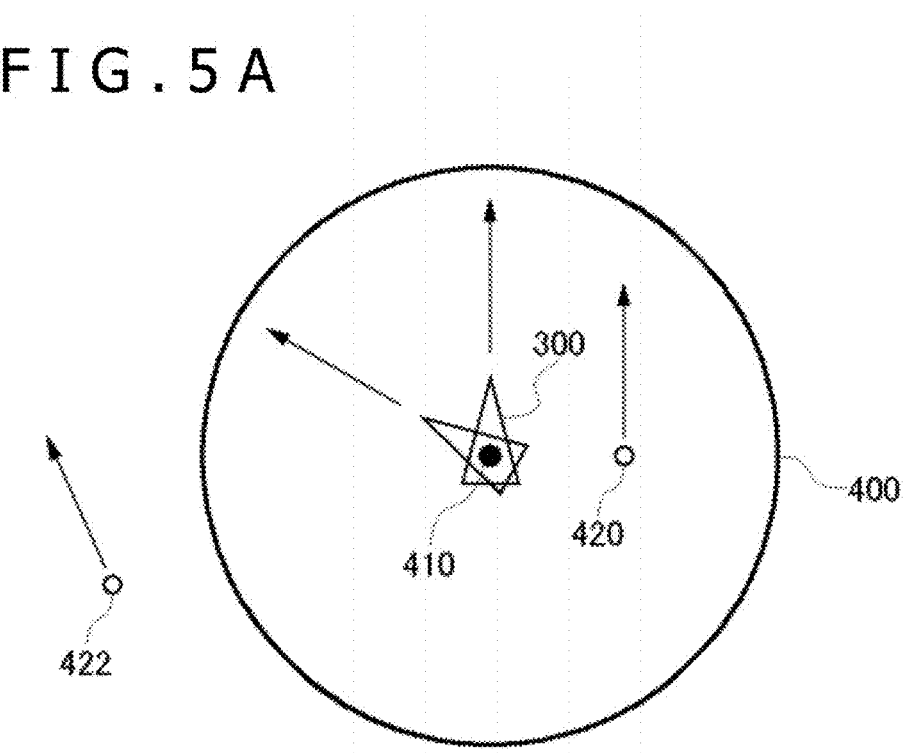
FIGS. 5A and 5B are diagrams for explaining a panorama image stored in a panorama image storage section.
Figure 5B:
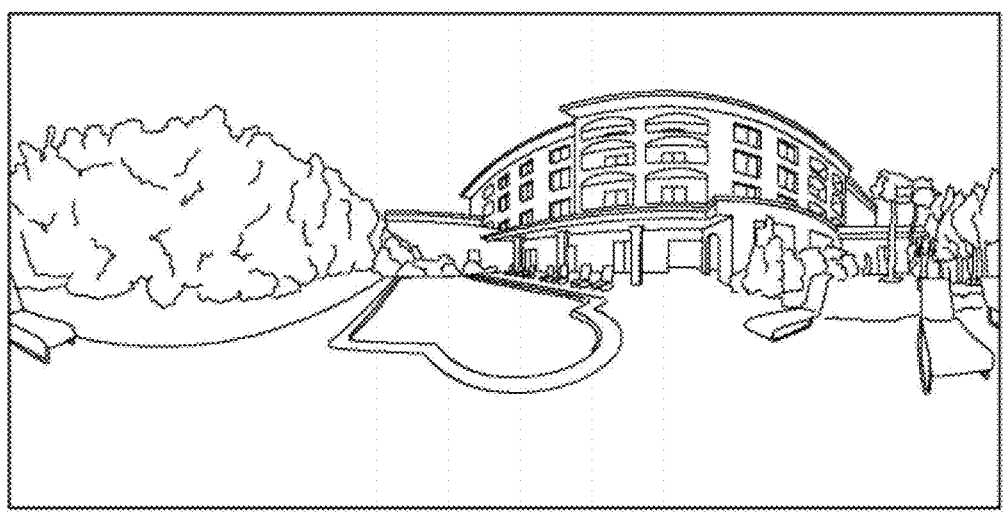

FIGS. 5A and 5B are diagrams for explaining a panorama image stored in the panorama image storage section 760. A panorama image shown in FIG. 5B as one example is obtained by performing shooting while panning a camera 300 in FIG. 5A.

An image of 360 degrees in the horizontal direction can be shot by performing shooting while panning the camera 300 by 360 degrees in the horizontal direction to change the rotational angle, and an image of the whole celestial sphere can be shot by performing shooting while further panning the camera 300 by 180 degrees in the vertical direction to change the elevation angle. This whole celestial sphere is a "panorama sphere" (numeral 400 in FIG. 5A) and the center of the whole celestial sphere is the "panorama center" (numeral 410 in FIG. 5A).

The panorama image in the present embodiment does not need to be the panorama image of the whole celestial sphere. For example, an image shot in such a manner that the camera 300 is not panned in the vertical direction and the elevation angle is fixed at zero degrees whereas the camera 300 is panned by 180 degrees in the horizontal direction may be employed as the panorama image. Furthermore, the angle of the panning of the camera 300 in the horizontal direction may also be smaller than 180 degrees.

The panorama sphere 400 is disposed in a world coordinate system and the panorama image generating device 700 generates a panorama image in sight in the direction of the line of sight through changing the posture and moving by a user who wears the head-mounted display 100 in the world coordinate system. Mapping is carried out on an appropriate scale between the world coordinate system and the real world in which the user who wears the head-mounted display 100 moves around. For example, according to the limit to the space of the real world in which the user who wears the head-mounted display 100 can move, the radius of the panorama sphere 400 is scaled to e.g. about several tens of centimeters to several meters.

The direction of the line of sight of the user is given by the rotational angle and elevation angle about the panorama center 410. An image to be displayed on the head-mounted display 100 can be generated by clipping out an image in sight in the given rotational angle and elevation angle from the panorama image of FIG. 5B with a predetermined angle of view. However, this is based on the premise that the point of view of the user corresponds with the panorama center.

The panorama image of the whole celestial sphere in FIG. 5B can provide an image in sight in an arbitrary direction of the line of sight from the panorama center. However, if the point of view gets off the panorama center, it becomes difficult to accurately represent an image around the point of view. For example, if the point of view gets separated from the panorama center 410 and translationally moves to a location shown by numeral 420 in FIG. 5A, it may be impossible to clip out an image in sight from the point 420 of view from the panorama image of the whole celestial sphere in FIG. 5B. This is because the panorama image of the whole celestial sphere in FIG. 5B is a panorama image as viewed from the panorama center 410 and is different from the image in sight from the point 420 of view.

Moreover, if the location of the user gets greatly separated from the panorama center 410 and the point of view moves off to the outside of the panorama sphere 400 as shown by numeral 422 in FIG. 5A, the point of view does not fall within the shooting range of the panorama image shot at the panorama center 410 anymore and it may become impossible to generate an image in sight from the point 422 of view from the panorama image of the whole celestial sphere in FIG. 5B.

As above, because the omnidirectional panorama image is obtained by performing shooting with the camera fixed at a fixed point, only looking over the image from the camera location as the center is allowed and it may be impossible to walk around in the panorama space and observe the image with a change in the location of the point of view. Also in the site that opens posted panorama images shot by users to the public, a panorama image browser provides an interface to browse panorama images in such a manner that the location of the point of view is fixed at a fixed point and the direction of the line of sight is rotated by 360 degrees, and changing the location of the point of view is not assumed. The panorama image generating device 700 of the present embodiment enables the user to move in the panorama space and freely change the location of the point of view to view the panorama image. In the present embodiment, plural panorama spheres are disposed in an overlapping manner in a world coordinate system and the panorama sphere is displayed with switching, which makes it possible to view the panorama image while freely moving in the panorama space.

Figure 6:
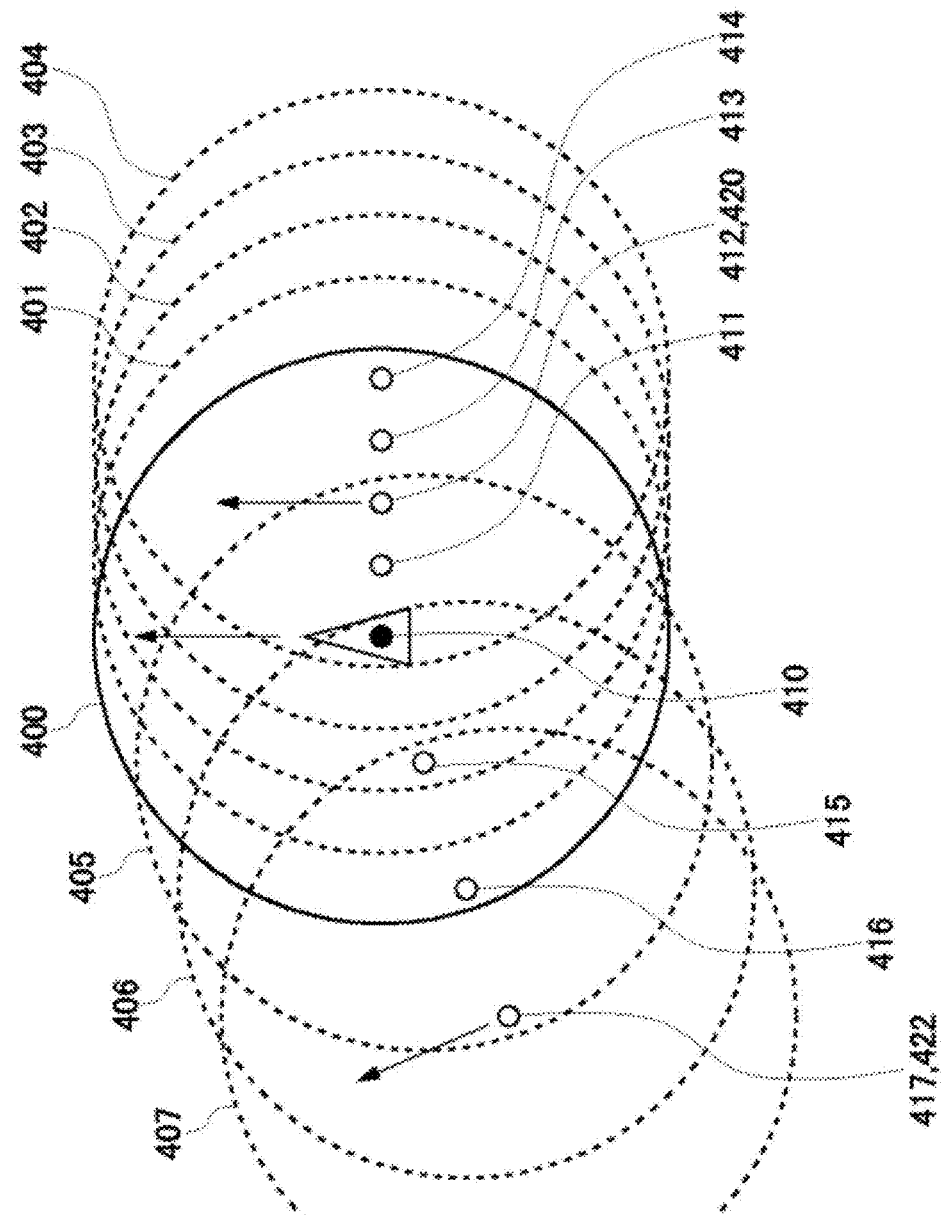
FIG. 6 is a diagram for explaining plural panorama spheres disposed in an overlapping manner.

FIG. 6 is a diagram for explaining plural panorama spheres disposed in an overlapping manner. In FIG. 6, as one example, for the present panorama sphere 400 (panorama center 410), first to fourth panorama spheres 401 to 404 (panorama centers 411 to 414) and fifth to seventh panorama spheres 405 to 407 (panorama centers 415 to 417) are disposed in an overlapping manner in a world coordinate system.

The point 420 of view in FIG. 5A exists at the location of the panorama center 412 of the second panorama sphere 402 in FIG. 6 and therefore a panorama image in sight from the point 420 of view in FIG. 5A can be generated from the second panorama sphere 402. Furthermore, the point 422 of view in FIG. 5A exists at the location of the panorama center 417 of the seventh panorama sphere 407 in FIG. 6 and therefore a panorama image in sight from the point 422 of view in FIG. 5A can be generated from the seventh panorama sphere 407.

Figure 7:
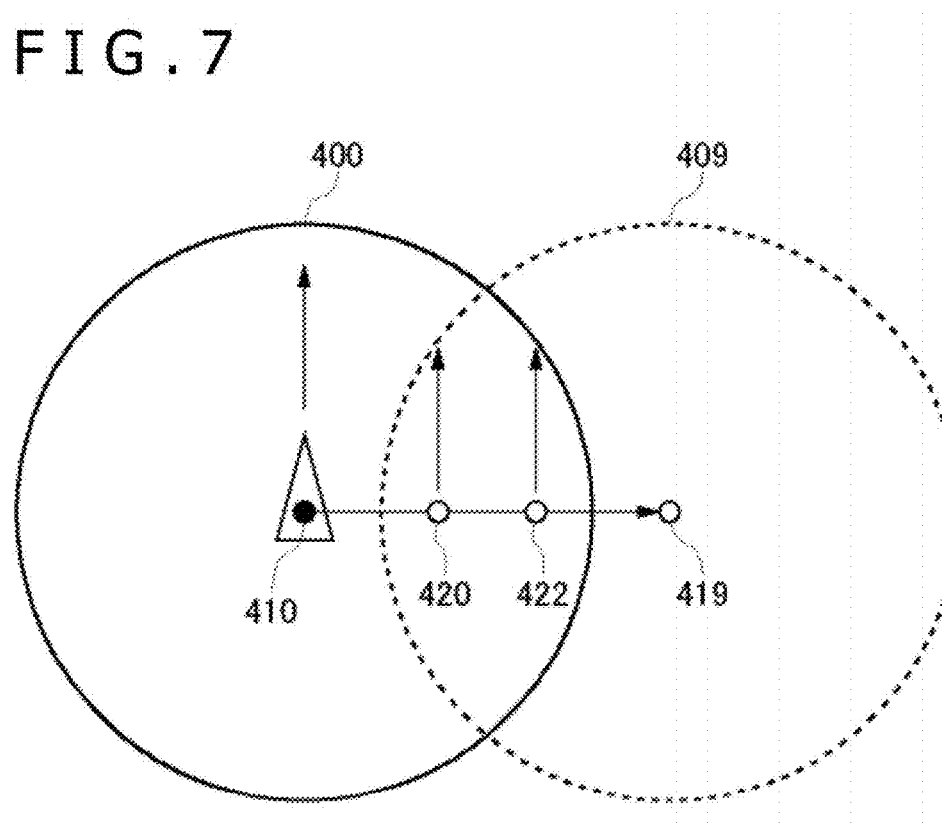
FIG. 7 is a diagram for explaining a method of generating a panorama image from two panorama spheres disposed in an overlapping manner in accordance with the movement of the point of view.

FIG. 7 is a diagram for explaining a method of generating a panorama image from two panorama spheres disposed in an overlapping manner in accordance with the movement of the point of view. Suppose that initially the point of view exists at the panorama center 410 of the present panorama sphere 400 and thereafter translationally moves in the right direction. In the right direction, another panorama sphere 409 (referred to as the "overlapping panorama sphere") is so disposed as to overlap with the present panorama sphere 400. Until reaching a panorama center 419 of the overlapping panorama sphere 409, the point of view passes through a midway overlapping region shown by numerals 420 and 422.

If the point of view reaches the panorama center 419 of the overlapping panorama sphere 409, a panorama image can be generated from the overlapping panorama sphere 409. However, when the point of view exists at the spots 420 and 422 in the midway overlapping region, either the present panorama sphere 400 or the overlapping panorama sphere 409 is selected to generate a panorama image. Alternatively, as another method, a panorama image of the present panorama sphere 400 is blended with a panorama image of the overlapping panorama sphere 409 to generate a panorama image as viewed from the location 420 or 422 of the point of view in the overlapping region.

For example, when the point of view exists at the location 420, which is closer to the panorama center 410 of the present panorama sphere 400, a panorama image is generated from the present panorama sphere 400. When the point of view exists at the location 422, which is closer to the panorama center 419 of the overlapping panorama sphere 409, a panorama image is generated from the overlapping panorama sphere 409.

Alternatively, in the case of blending a panorama image of the present panorama sphere 400 with a panorama image of the overlapping panorama sphere 409 to generate a panorama image as viewed from the location 420 or 422 of the point of view, the two panorama images are blended in the following manner. Specifically, for the location 420 of the point of view, which is closer to the panorama center 410 of the present panorama sphere 400, the degree of weighting of the panorama image of the present panorama sphere 400 is set high. For the location 422 of the point of view, which is closer to the panorama center 419 of the overlapping panorama sphere 409, the degree of weighting of the panorama image of the overlapping panorama sphere 409 is set high.

Ideally, if panorama spheres are disposed in an overlapping manner with almost no gap as exemplified in FIG. 6, even when the point of view freely moves, an accurate panorama image can be generated from the panorama sphere having the panorama center with which the new location of the point of view corresponds. By switching the panorama sphere in association with the movement of the point of view in this manner, "seamless translational movement" is implemented.

However, if panorama spheres are disposed in an overlapping manner with almost no gap, the amount of data becomes huge. Therefore, it is practical to discretely dispose panorama spheres in order to reduce the amount of data. In this case, in a region where the panorama center is not disposed, "pseudo translational movement" in which a panorama image is corrected to generate an image after translational movement in a pseudo manner is substituted.

FIGS. 8A and 8B are diagrams for explaining the pseudo translational movement. When, as shown in FIG. 8A, the point 420 of view exists at a spot resulting from translational movement from the panorama center 410 toward the right side by a translational movement distance d and the direction of the line of sight is oriented toward the front side, the panorama image processor 750 clips out an image in sight in the direction of a pseudo rotational angle $\theta'$ from the panorama center 410 from the panorama image of the panorama sphere 400 and the correction processor 780 carries out keystone correction on the clipped image to generate an image in sight in the front direction from the point 420 of view in a pseudo manner. When the radius of the panorama sphere 400 is defined as r, the pseudo rotational angle $\theta'$ can be obtained from a relationship of $\cos \theta' = d/r$. Here, the keystone correction is correction to enlarge the right side of the clipped image compared with the left side. This can generate, from the panorama image of the panorama sphere 400, an image appearing as if the user translationally moved by the translational movement distance d and looked in the front direction.

When, as shown in FIG. 8B, the point 420 of view exists at a spot resulting from translational movement from the panorama center 410 toward the right side by the translational movement distance d and the direction of the line of sight is the direction of a rotational angle $\theta$, the panorama image processor 750 clips out an image in sight in the direction of the pseudo rotational angle $\theta'$ from the panorama center 410 from the panorama sphere 400 and the correction processor 780 carries out keystone correction on the clipped image. The pseudo rotational angle $\theta'$ can be obtained from a relationship of $\tan \theta = r \sin \theta'/(r \cos \theta' - d)$. This can generate, from the panorama image of the panorama sphere 400, an image appearing as if the user translationally moved by the translational movement distance d and looked in the direction of the rotational angle $\theta$.

An example of the pseudo translational movement will be described with reference to FIGS. 9A to 9D and FIGS. 10A to 10D.

Figure 9A:
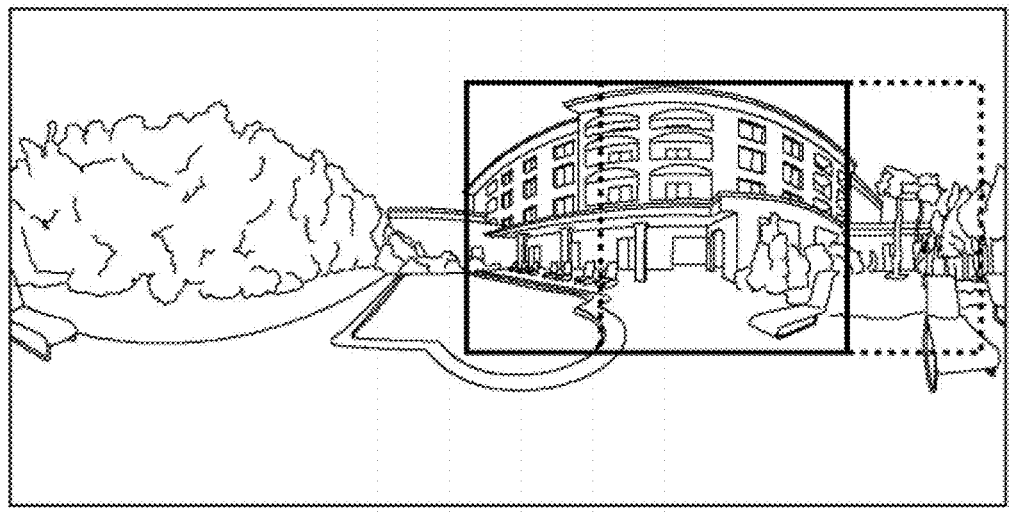
FIGS. 9A to 9D are diagrams for explaining, for comparison, a method of clipping out a panorama image in conformity to the direction of the line of sight when the point of view exists at a panorama center.
Figure 9B:
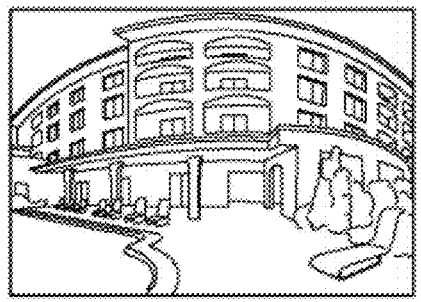
Figure 9C:
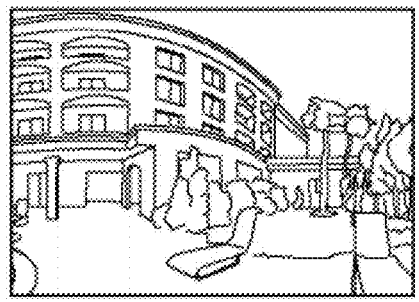
Figure 9D:
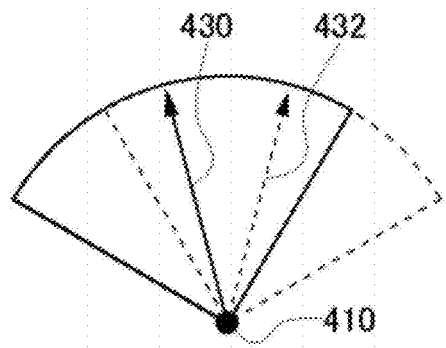

FIGS. 9A to 9D are diagrams for explaining, for comparison, a method of clipping out a panorama image in conformity to the direction of the line of sight when the point of view exists at a panorama center. When the direction of the line of sight is rotated at the panorama center 410 as shown in FIG. 9D, an image in sight in a direction 430 of the line of sight is clipped out from a rectangular region surrounded by a solid line in a panorama image of FIG. 9A and is displayed on the head-mounted display 100 as shown in FIG. 9B. Furthermore, an image in sight in a direction 432 of the line of sight is clipped out from a rectangular region surrounded by a dotted line in the panorama image of FIG. 9A and is displayed on the head-mounted display 100 as shown in FIG. 9C.

Figure 10A:
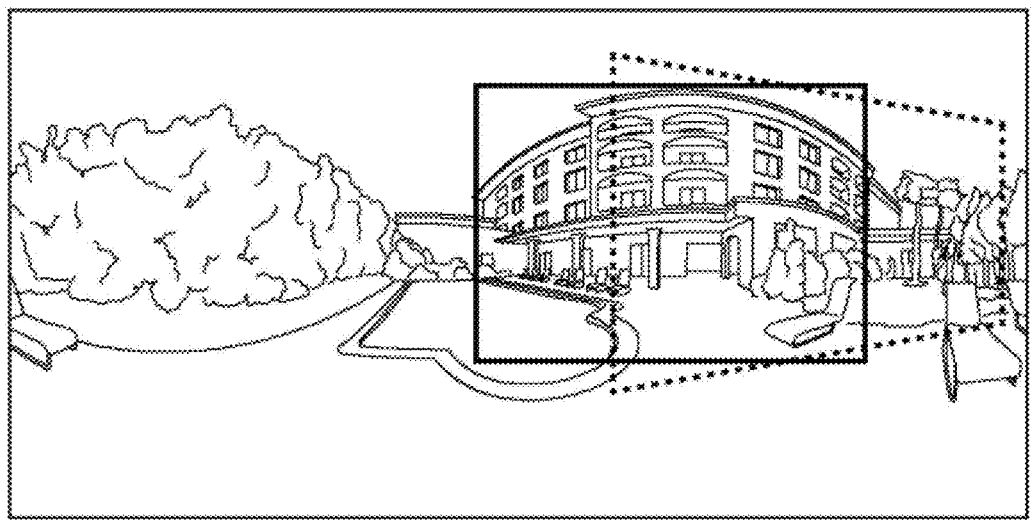
FIGS. 10A to 10D are diagrams for explaining a method of generating a panorama image by the pseudo translational movement when the point of view translationally moves from a panorama center.
Figure 10B:
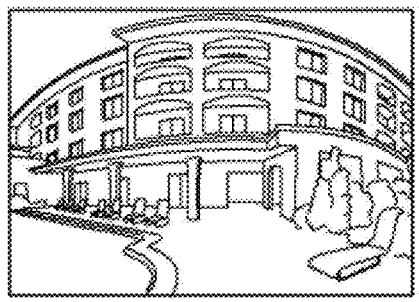
Figure 10C:
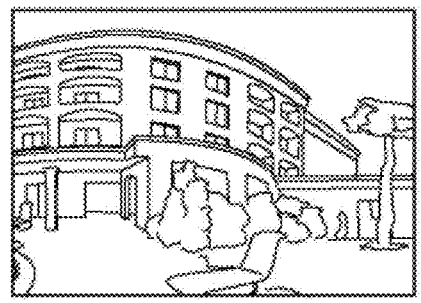
Figure 10D:
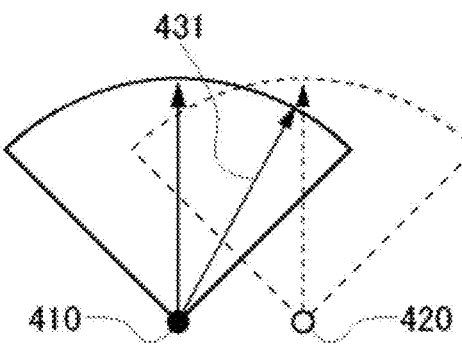

FIGS. 10A to 10D are diagrams for explaining a method of generating a panorama image by the pseudo translational movement when the point of view translationally moves from a panorama center. An image in sight in the front direction from the panorama center 410 as shown in FIG. 10D is clipped out from a rectangular region surrounded by a solid line in a panorama image of FIG. 10A and is displayed on the head-mounted display 100 as shown in FIG. 10B. On the other hand, an image in sight in the front direction from the point 420 of view resulting from translational movement from the panorama center 410 to the right by the translational movement distance d is generated in the following manner. An image in sight in the direction of the pseudo rotational angle θ' (direction 431 of the line of sight) from the panorama center 410 is clipped out from a trapezoidal region surrounded by a dotted line in the panorama image of FIG. 10A. The clipped trapezoidal region is displayed after being corrected to a rectangle as shown in FIG. 10C. As a result, the right side of the image is enlarged compared with the left side. Due to this, an image appearing as if translational movement from the panorama center 410 to the right was made is displayed on the head-mounted display 100.

As above, even when the point 420 of view gets separated from the panorama center 410, as long as the point 420 of view falls within the range of the panorama sphere 400, translational movement can be implemented in a pseudo manner by obtaining the pseudo rotational angle about the panorama center 410 and carrying out keystone correction on a panorama image in sight in the direction of the pseudo rotational angle to generate a pseudo image.

Figure 11:
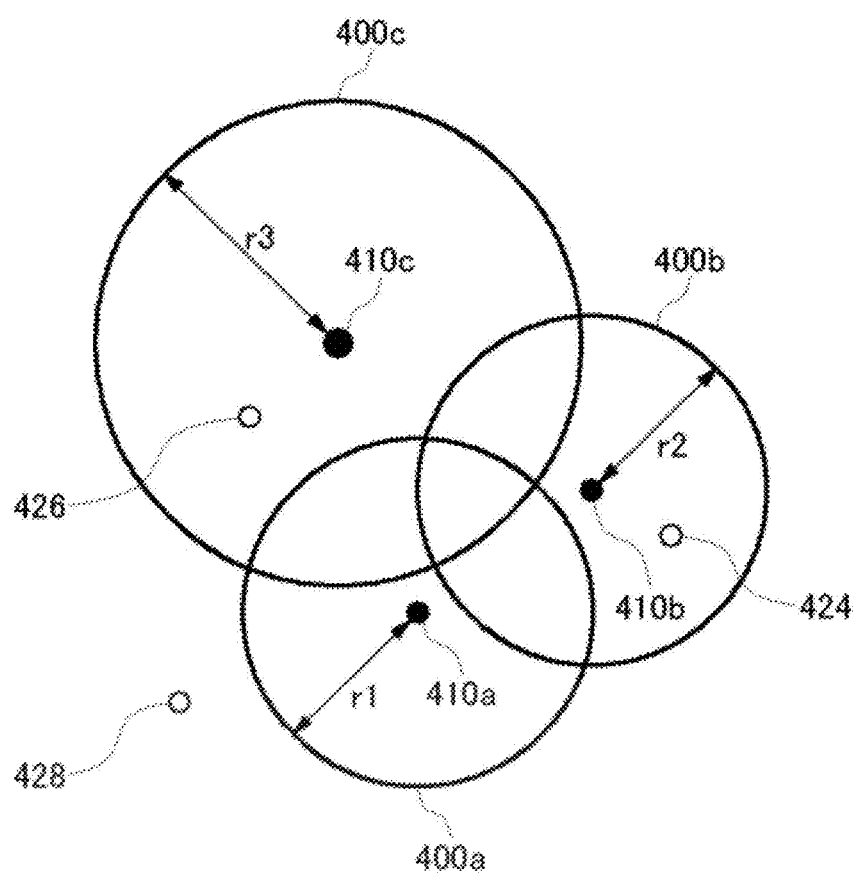
FIG. 11 is a diagram for explaining the relationship between plural panorama spheres overlapping with each other and the point of view.

FIG. 11 is a diagram for explaining the relationship between plural panorama spheres overlapping with each other and the point of view. In a world coordinate system, a first panorama sphere 400a is a sphere that is centered at a first panorama center 410a and has a radius r1. A second panorama sphere 400b is a sphere that is centered at a second panorama center 410b and has a radius r2. A third panorama sphere 400c is a sphere that is centered at a third panorama center 410c and has a radius r3. The first to third panorama spheres 400a to 400c overlap with each other and here the radii of the three panorama spheres have a relationship of r1=r2<r3. The radii of the plural panorama spheres may be equal to each other or may be different from each other as above.

The radius of the panorama sphere is decided in consideration of a range in which distortion of an image of the panorama sphere can be permitted although the image of the panorama sphere is used as it is without correction when the point of view deviates from the panorama center. The radius of the panorama sphere depends on the distance to a shot subject (or a three-dimensional model, in the case of computer graphics). The radius of the panorama sphere becomes larger when the distance to the subject becomes longer, and the radius of the panorama sphere becomes smaller when the distance to the subject becomes shorter. This is because of the following reason. Specifically, in the case of an image obtained by shooting a distant view, the scene in sight does not greatly change even when the point of view considerably deviates. In contrast, in the case of an image obtained by shooting a near view, even slight deviation of the point of view causes a large change in the scene.

If the point of view moves from the first panorama center 410a to a location shown by numeral 424, the point 424 of view after the movement is outside the first panorama sphere 400a but exists in the second panorama sphere 400b. In this case, an image as viewed from the point 424 of view can be generated from the panorama image of the second panorama sphere 400b. Furthermore, also when the point of view moves from the first panorama center 410a to a location shown by numeral 426, the point 426 of view after the movement is outside the first panorama sphere 400a but exists in the third panorama sphere 400c. In this case, an image as viewed from the point 426 of view can be generated from the panorama image of the third panorama sphere 400c.

On the other hand, if the point of view moves from the first panorama center 410a to a location shown by numeral 428, the point 428 of view after the movement exists in none of the first panorama sphere 400a, the second panorama sphere 400b, and the third panorama sphere 400c and thus it may be impossible to generate an image as viewed from the point 428 of view. Therefore, by disposing as many other panorama spheres as possible with overlapping with the first panorama sphere 400a, the configuration is so made that an image as viewed from the point of view after movement can be generated from any panorama sphere wherever the point of view moves from the first panorama center 410a.

FIG. 12 is a diagram showing plural panorama spheres overlapping with each other. Second to seventh panorama spheres 400b to 400g are so disposed as to overlap with the first panorama sphere 400a. Due to this, even when the point of view moves off to the outside of the first panorama sphere 400a, the point of view after the movement belongs to any of the second to seventh panorama spheres 400b to 400g, which are so disposed as to overlap with the first panorama sphere 400a, and an image as viewed from the point of view after the movement can be generated by using the overlapping panorama sphere of the movement destination. When the point of view moves to the outside of these overlapping panorama spheres as well as the first panorama sphere 400a, if there is a panorama sphere disposed in an overlapping manner at the movement destination, an image as viewed from the point of view after the movement can be generated by using the overlapping panorama sphere of the movement destination.

As above, even when the point of view moves to the outside of the panorama sphere, the panorama image can be generated without interruption by switching to the overlapping panorama sphere.

By disposing plural panorama spheres overlapping with each other in a world coordinate system and switching the panorama sphere according to the location of the point of view in this manner, seamless movement among the panorama spheres is enabled. The panorama spheres may be made to overlap with each other not only in the horizontal direction but also in the vertical direction. Due to the existence of the overlapping panorama spheres also in the height direction, the user can seamlessly move in the panorama space through switching of the panorama sphere also when bending down or jumping, when going up the stairs of a building, when moving to a high building, etc.

Furthermore, by preparing panorama spheres for the left eye and panorama spheres for the right eye, stereo viewing of a panorama space may be allowed and a sense of reality of movement in the space may be improved.

As a trigger for movement to the space of the overlapping panorama sphere, reaching of the actual movement distance of the user to a threshold may cause automatic movement, and making any input by the user through gesture, voice, or the like may cause movement. In movement to the overlapping panorama space, a state in which the user is making warp travel in the space may be displayed as animation.

Figure 13:
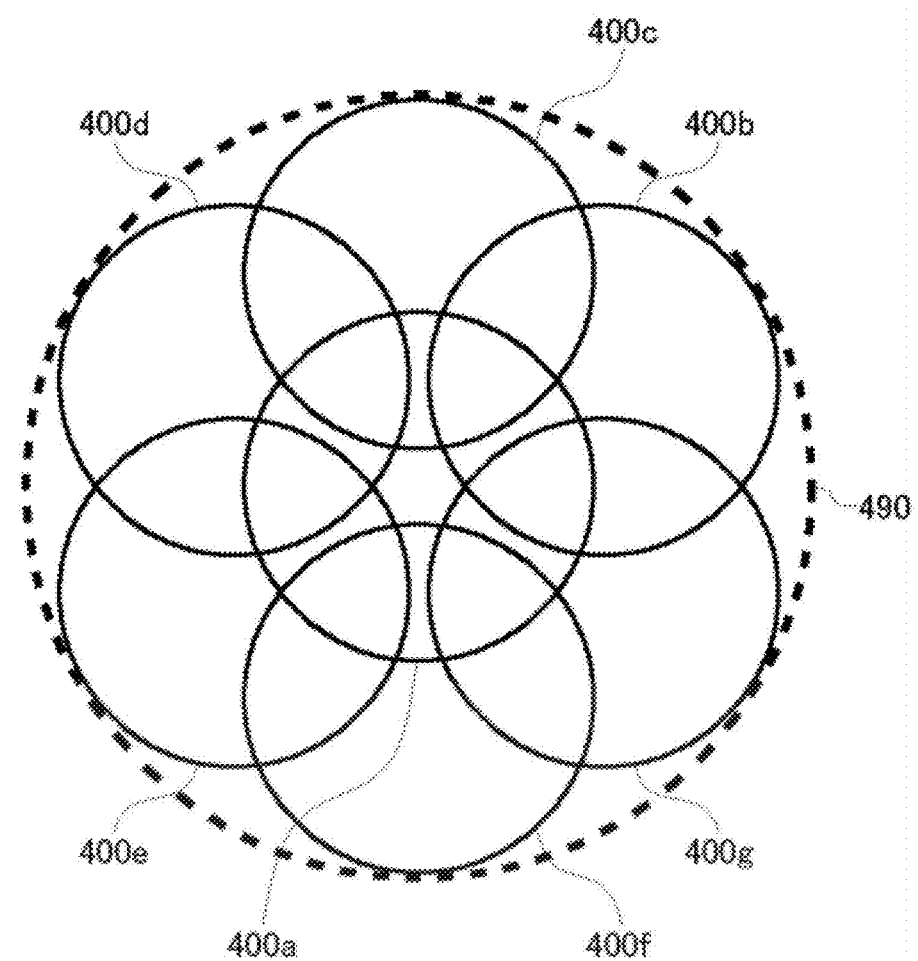
FIG. 13 is a diagram for explaining a method of calibration.

FIG. 13 is a diagram for explaining a method of calibration. The scale is so adjusted that the movable range in the real world of the user corresponds to the movable range in the panorama space including panorama spheres disposed in an overlapping manner. Assuming that the movable range in the real world is e.g. two meters and the radius of a circle 490 indicating the movable range in the panorama space including the second to seventh panorama spheres 400b to 400g, which are so disposed as to overlap with the first panorama sphere 400a, is 120, the ratio of the real world to the virtual world is 1:60 and therefore the scaling ratio is 1/60.

To enhance the feeling of immersion of the user, it is ideal that the movable range in the real world of the user can be so set as to have the same actual dimensions as the movable range in the panorama space. However, because of a limit to the space of the real world, it may be impossible to set the scale ratio of the real world to the panorama space to 1:1 in many cases. When the scale is different between the real world and the panorama space, the user feels a sensation as if becoming a giant or dwarf in the panorama space.

If there is a limit to the space in the real world, the location of the center of the real world in which the user is present is recorded and at least one movement limit location in the real world is recorded. The circle radius of the movable range in the real world is thereby obtained. Thus, calibration is carried out by associating this radius with the radius of the circle 490 indicating the movable range in the panorama space.

Figure 14:
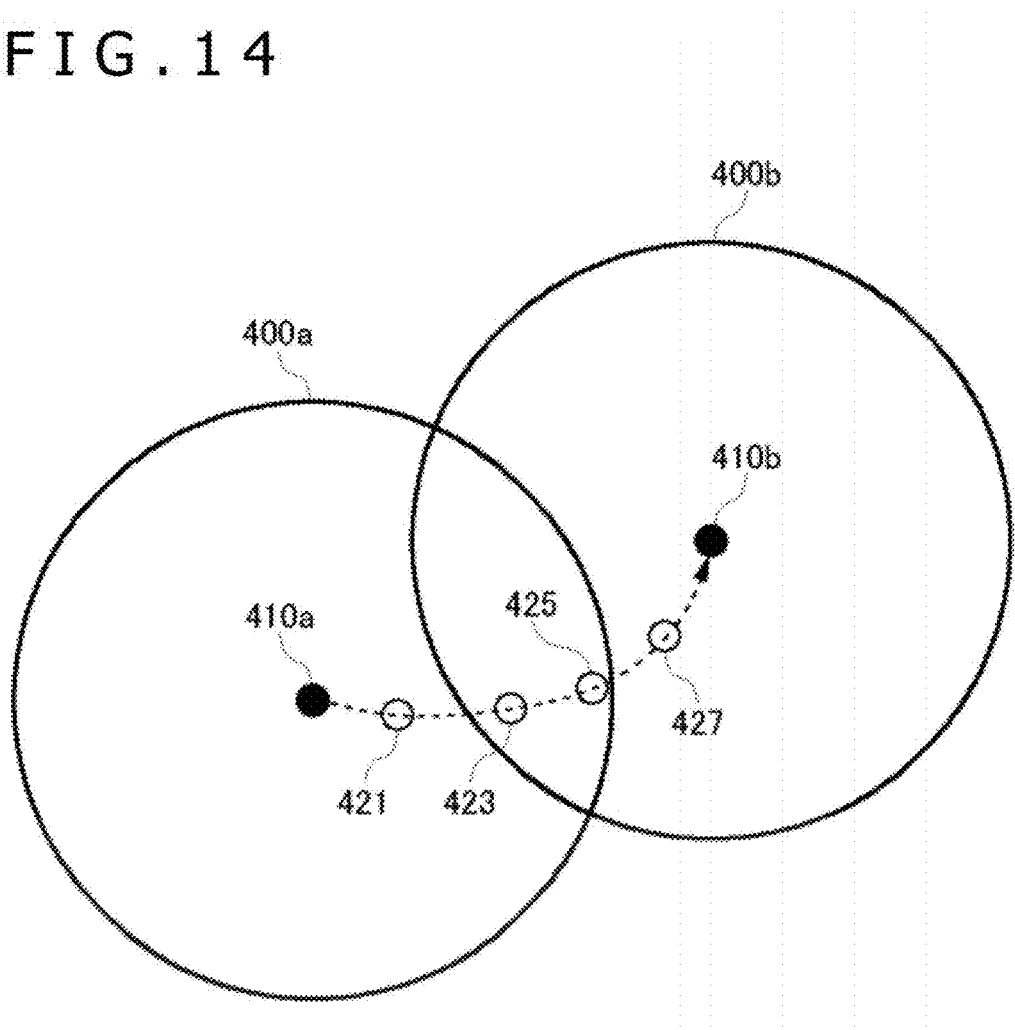
FIG. 14 is a diagram for explaining a method of generating a panorama image in the case of movement from a panorama sphere in which the point of view exists to another panorama sphere.

FIG. 14 is a diagram for explaining a method of generating a panorama image in the case of movement from a panorama sphere in which the point of view exists to another panorama sphere. Suppose that, with respect to the first panorama sphere 400a, the point of view gets separated from the first panorama center 410a and moves to locations shown by numerals 421, 423, 425, and 427. When the point of view exists in the first panorama sphere 400a as shown by numeral 421, a pseudo image based on the pseudo translational movement described with FIGS. 8A and 8B and FIGS. 10A to 10D is generated and displayed.

Next, when the point of view falls within the overlapping region between the first panorama sphere 400a and the second panorama sphere 400b as shown by numerals 423 and 425, either the first panorama sphere 400a or the second panorama sphere 400b is selected to generate a panorama image as described with FIG. 7. At this time, the panorama image of the selected panorama sphere may be corrected and a pseudo image based on the pseudo translational movement may be generated.

Alternatively, as another method, a panorama image in sight from the location 423 or 425 of the point of view may be generated by blending a panorama image of the first panorama sphere 400a with a panorama image of the second panorama sphere 400b. Also in this case, the pseudo image based on the pseudo translational movement may be blended. The blending ratio between the panorama image of the first panorama sphere 400a and the panorama image of the second panorama sphere 400b is so set that the ratio of the panorama image of the second panorama sphere 400b becomes higher as the point of view comes closer to the second panorama center 410b.

Moreover, when the point of view gets out of the first panorama sphere 400a although existing in the second panorama sphere 400b as shown by numeral 427, switching is made to the second panorama sphere 400b, to which the point 427 of view after the movement belongs, and an image as viewed from the panorama center 410b of the second panorama sphere 400b is clipped out and displayed. Also in this case, it is possible to similarly deal with the deviation between the second panorama center 410b and the point 427 of view through generation of a pseudo image based on the pseudo translational movement.

As above, in response to the movement of the point of view in the first panorama sphere 400a, a pseudo panorama image based on the pseudo translational movement is generated. In the overlapping region between the first panorama sphere 400a and the second panorama sphere 400b, a panorama image of the first panorama sphere 400a and a panorama image of the second panorama sphere 400b are used selectively or in combination to generate a panorama image to be displayed. When the point of view moves to the outside of the first panorama sphere 400a, switching to the second panorama sphere 400b is made. Due to this scheme, switching from the first panorama sphere 400a to the second panorama sphere 400b is smoothly implemented. That is, when the point of view moves from the inside of the first panorama sphere 400a to the outside thereof, instead of sudden switching from the first panorama sphere 400a to the second panorama sphere 400b, the correction processing based on the pseudo translational movement and the blending processing by use of overlapping panorama spheres are added at an intermediate stage. This can avoid sudden switching and implement natural movement between the panorama spheres.

Moreover, in the present embodiment, a method to be described below is devised in order to make the boundary between panorama spheres appear as natural as possible in switching from a certain panorama sphere to another panorama sphere.

Figure 15:
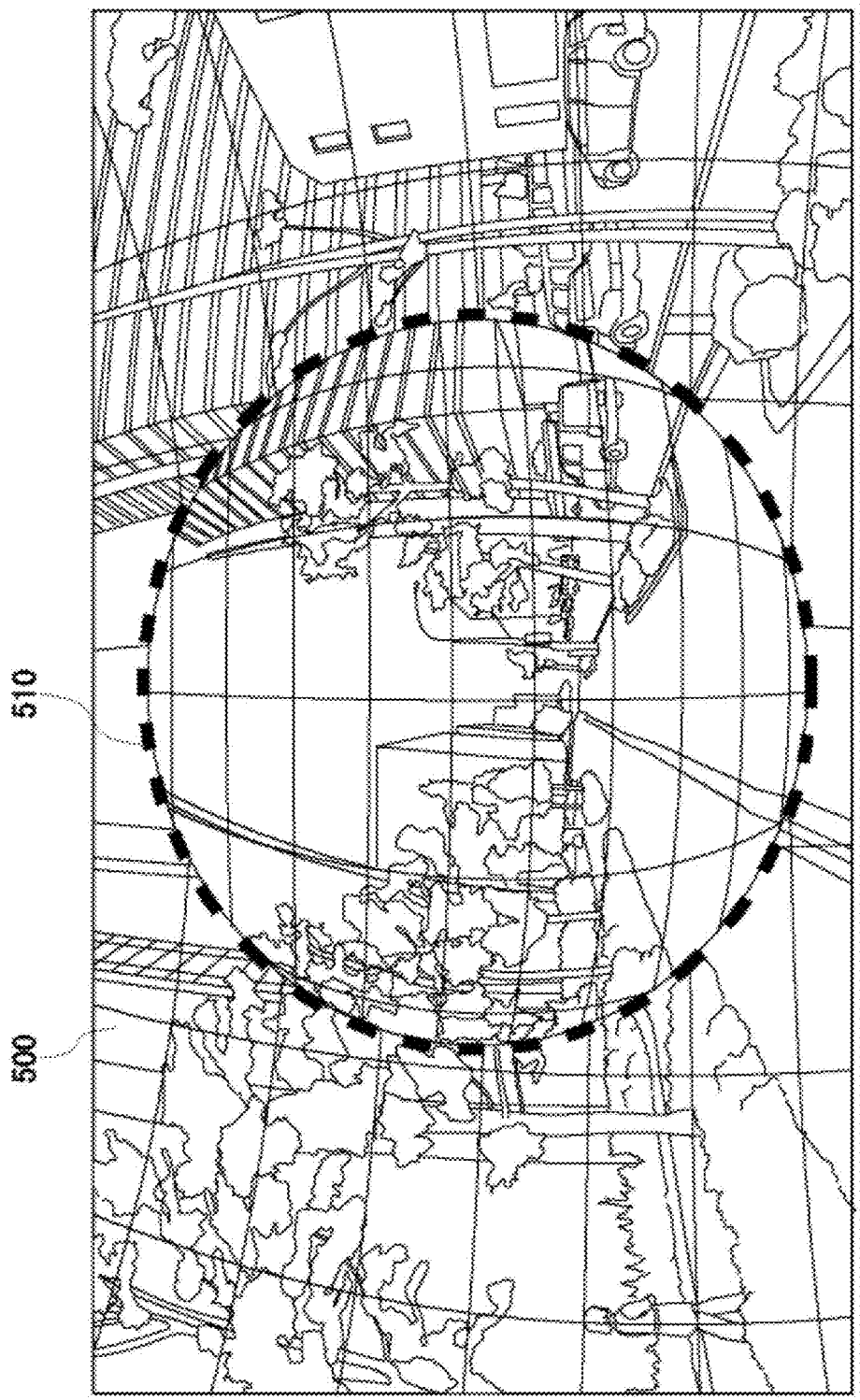
FIG. 15 is a diagram for explaining a method of synthesizing images of panorama spheres overlapping with each other.

FIG. 15 is a diagram for explaining a method of synthesizing images of panorama spheres overlapping with each other. For an image 500 of the present panorama sphere to which the point of view belongs, an image 510 of a panorama sphere that is so disposed as to overlap with the present panorama sphere is displayed in a dotted line region. At this time, the images of the two panorama spheres are joined to each other by three-dimensional stitching and the overlapping parts are blended to prevent the boundary part on the dotted line from appearing unnatural as much as possible. When the point of view moves into the overlapping panorama sphere, the panorama sphere of the processing target is switched from the present panorama sphere to the overlapping panorama sphere. However, as long as the point of view exists in the present panorama sphere, the image of the overlapping panorama sphere is only displayed in the dotted line region in the range visible from the point of view.

A panorama sphere that is so disposed as to overlap with the present panorama sphere does not necessarily exist. Therefore, icons or the like may be displayed for discrimination between the case in which an overlapping panorama sphere exists and the case in which it does not exist.

Figure 16:
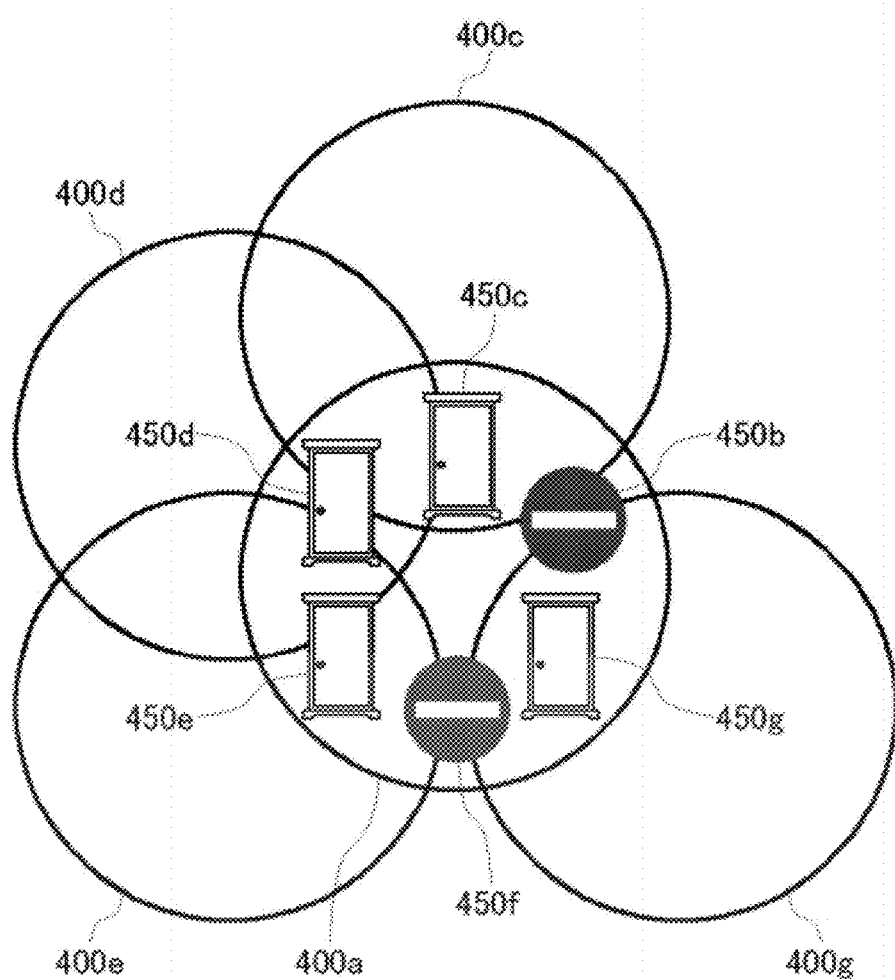
FIG. 16 is a diagram for explaining an example of icons indicating whether or not an overlapping panorama sphere exists.

FIG. 16 is a diagram for explaining an example of icons indicating whether or not an overlapping panorama sphere exists. Door icons 450c, 450d, 450e, and 450g indicating that overlapping panorama spheres 400c, 400d, 400e, and 400g exist for the present panorama sphere 400a in the directions of these door icons are displayed in the image of the present panorama sphere 400a. This prompts the user to move in the direction of the door icon. On the other hand, if an overlapping panorama sphere does not exist, a warning is given by displaying icons 450b and 450f indicating prohibition of trespassing in the directions of these icons in the image of the present panorama sphere 400a. This will make the user give up moving in the direction of the icon.

The present panorama sphere and the overlapping panorama sphere do not necessarily need to be images that are spatially continuous. Panorama spheres having no relation to each other may be disposed in a world coordinate system in an overlapping manner. Furthermore, at the position of a specific building displayed in the present panorama sphere, a panorama image obtained by shooting the inside of the building may be disposed as an overlapping panorama sphere. Moreover, when a sign indicating a specific place is displayed in a panorama image of the present panorama sphere, a panorama image obtained by shooting the specific place may be disposed at the position of the sign as an overlapping panorama sphere. In the case of disposing a panorama sphere having no spatial continuity as an overlapping panorama sphere, an unnatural appearance is caused if the image of the overlapping panorama sphere is synthesized as it is with the image of the present panorama sphere as in FIG. 15. Accordingly, differently from the case of FIG. 15, ingenuity such as hiding the boundary between the present panorama sphere and the overlapping panorama sphere by an appropriate three-dimensional object is desired when the image of the overlapping panorama sphere is synthesized with the image of the present panorama sphere.

Figure 17:
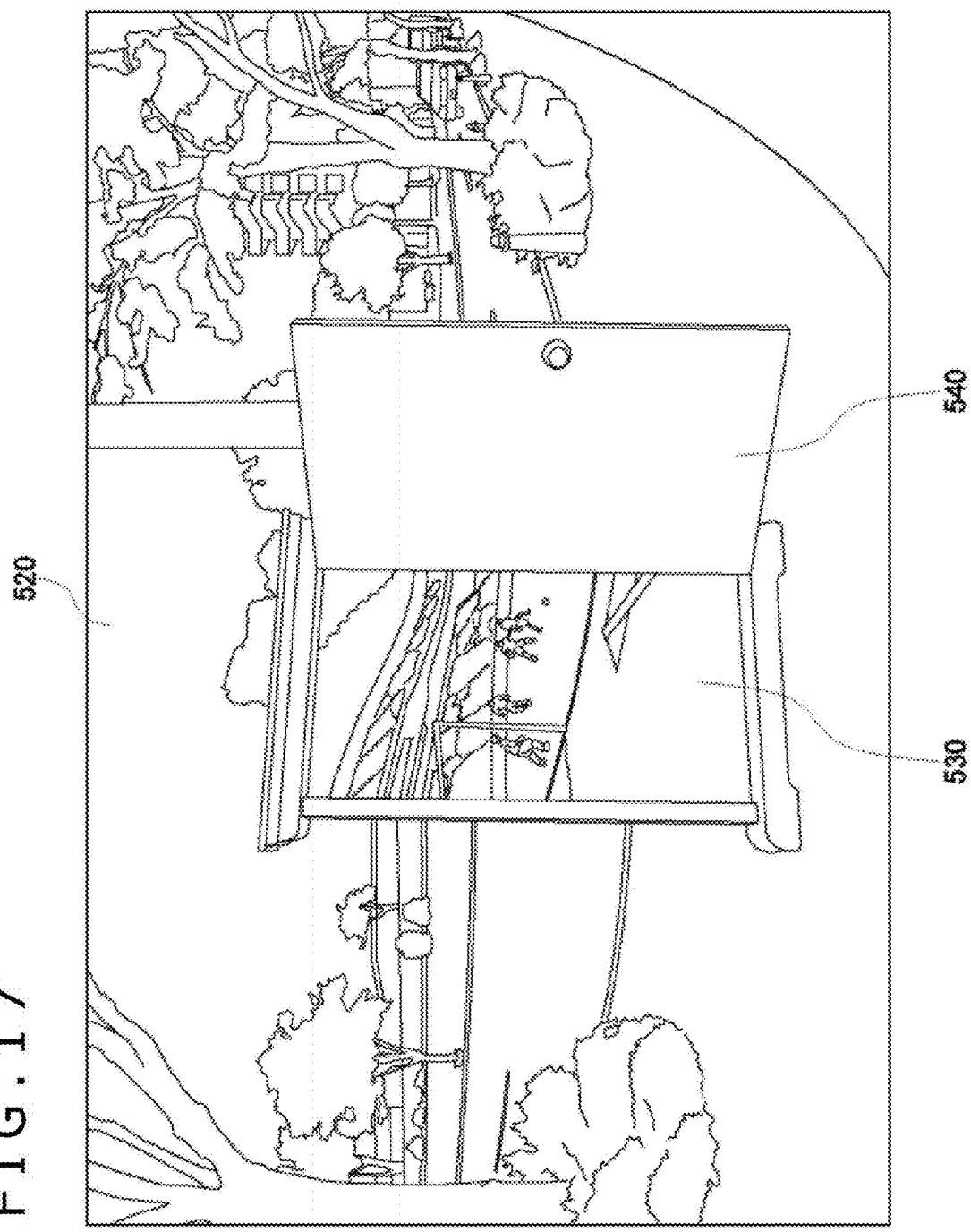
FIG. 17 is a diagram for explaining an example of displaying an image of an overlapping panorama sphere having no spatial continuity.

FIG. 17 is a diagram for explaining an example of displaying an image of an overlapping panorama sphere having no spatial continuity. An image 530 of the overlapping panorama sphere is synthesized with an image 520 of the present panorama sphere. The image 520 of the present panorama sphere is an image of a street in a town whereas the image 530 of the overlapping panorama sphere is a moving image of a soccer match. In this case, a door 540 is disposed as a three-dimensional object in order to hide the boundary between the image 520 of the present panorama sphere and the image 530 of the overlapping panorama sphere. Furthermore, the configuration is so designed that, when a user comes close to the door 540, the door 540 is opened and the image 530 of the overlapping panorama sphere is displayed on the other side across the door 540. The image of the overlapping panorama sphere visible through the door 540 is not a planar image but an image obtained by mapping the image of the overlapping panorama sphere in sight from the location of the point of view of the user. Therefore, how this image looks varies depending on the location of the point of view of the user. For example, when the image is seen from the right side, the left side of the world of the overlapping panorama sphere is in sight.

As long as the user remains on the front side of the door 540, the state in which the user peeps at the overlapping panorama sphere from the present panorama sphere continues. When the user moves to the other side across the door 540, the panorama sphere of the processing target is switched to the overlapping panorama sphere. From then on, the user is deemed to be present in the space of the overlapping panorama sphere and an image of the overlapping panorama sphere as viewed from the location of the point of view of the user is generated. The door 540 is an interface to implement the movement of the point of view of the user from the present panorama sphere to the overlapping panorama sphere.

The three-dimensional object to hide the boundary of the overlapping panorama sphere may be another object representing some kind of frame, such as a window. Furthermore, an image of the overlapping panorama sphere may be clipped out in conformity to the shape of a three-dimensional object existing in the space of the overlapping panorama sphere and be synthesized with an image of the present panorama sphere. For example, in the case of a dome-shaped building, an image is clipped out into a dome shape in conformity to the shape of the building and is synthesized.

Figure 18:
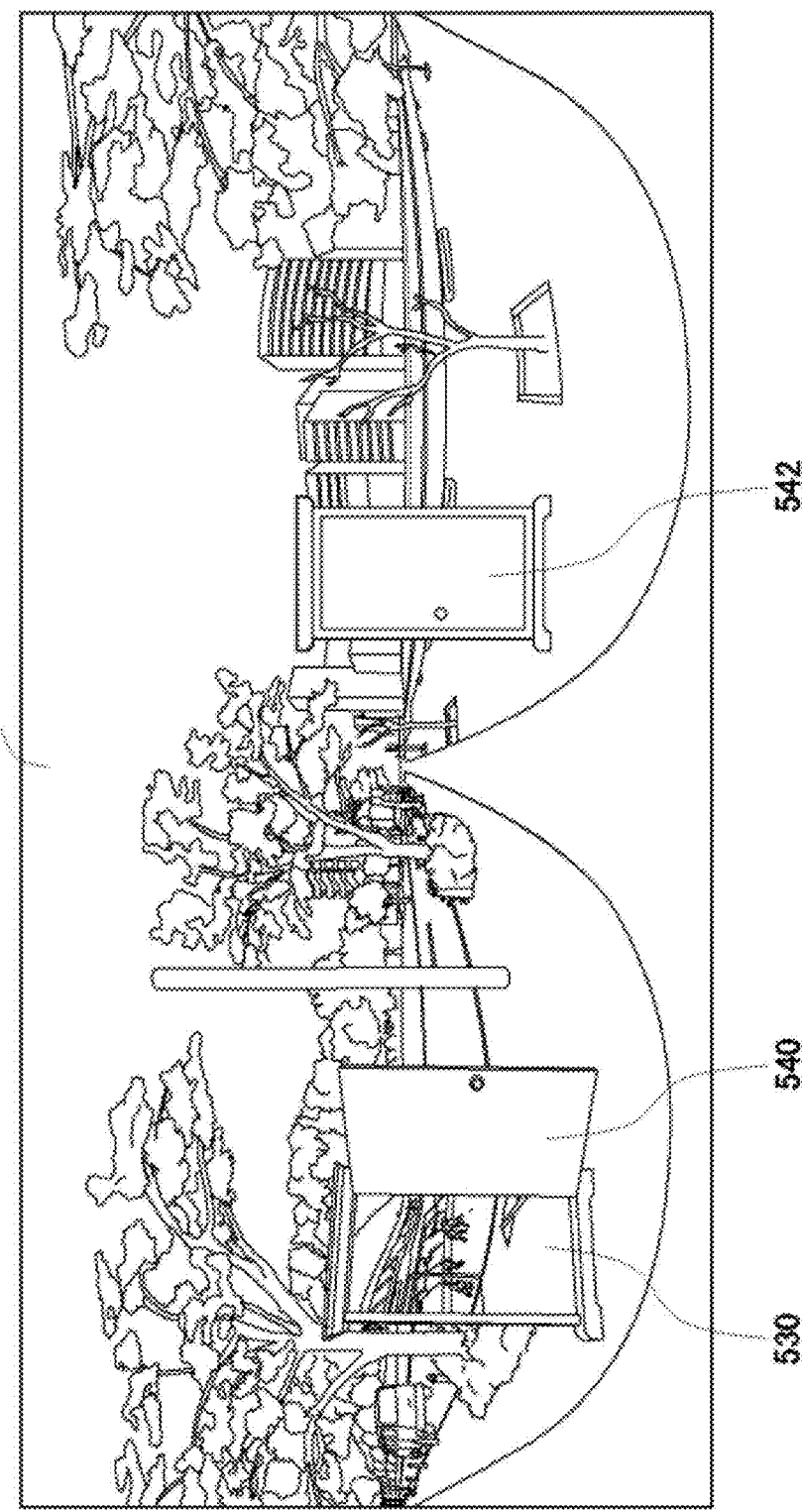
FIG. 18 is a diagram for explaining an example of displaying images of plural overlapping panorama spheres.

FIG. 18 is a diagram for explaining an example of displaying images of plural overlapping panorama spheres. If plural overlapping panorama spheres having no spatial continuity are disposed for the present panorama sphere, doors 540 and 542 are disposed in the directions in which the overlapping panorama spheres exist in a panorama image 522 of the present panorama sphere. Furthermore, when a user moves in the present panorama sphere and gets close to either the door 540 or 542, the door 540 or 542 is opened and an image of the corresponding overlapping panorama sphere is displayed on the other side.

The overlapping panorama spheres associated with the doors 540 and 542 may be decided in advance according to the places at which the doors 540 and 542 are set. Alternatively, the overlapping panorama spheres associated with the doors 540 and 542 may be not fixed. For example, it is possible to employ a configuration in which a user comes in front of the door 540 or 542 and specifies a place to which the user wants to move and thereby is allowed to move to the panorama sphere of the specified place when opening the door. The following configuration may also be employed. Specifically, a user conveys a place to which the user wants to go by voice or the like at a location at which a door is displayed. An overlapping panorama sphere obtained by shooting the place is thereby dynamically associated, so that an image of the overlapping panorama sphere is in sight when the door is opened. In this sense, it can also be said that the overlapping panorama sphere is associated with the door and, by disposing the door at an arbitrary location in the space of the present panorama sphere, consequently the overlapping panorama sphere is so disposed as to overlap with the present panorama sphere.

It is possible to employ a configuration in which the door is opened when a user virtually touches the knob of the door. The following configuration may also be employed. Specifically, after movement to an overlapping panorama sphere on the other side across the door, when a user turns around, the door is disposed and the user can return to the original panorama sphere through the door.

Figure 19B:
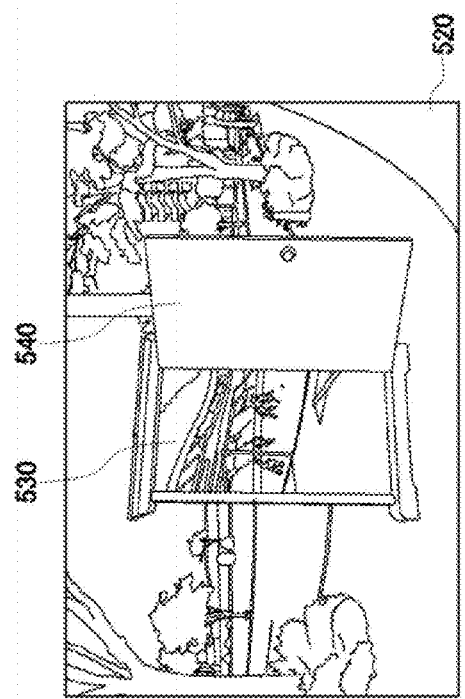
FIGS. 19A to 19C are diagrams for explaining a method of generating images of an overlapping panorama sphere.
Figure 19C:
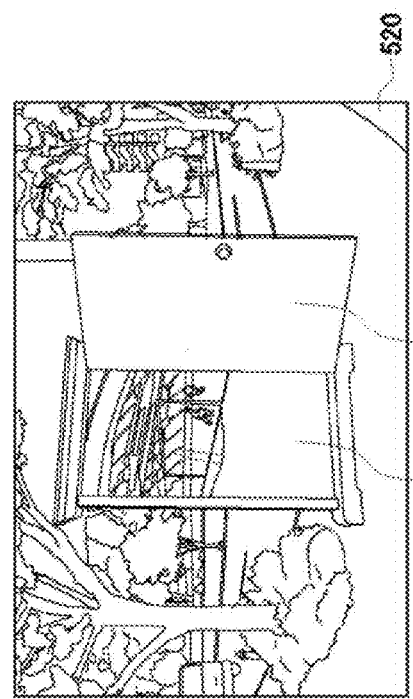
Figure 19A:
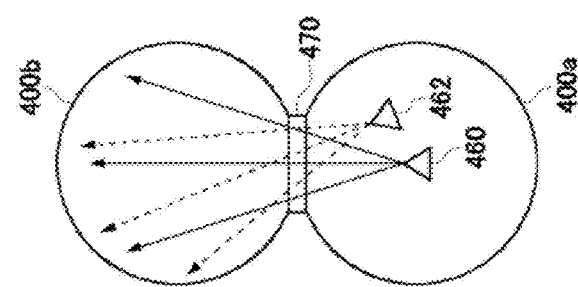

FIGS. 19A to 19C are diagrams for explaining a method of generating images of an overlapping panorama sphere.

FIG. 19A shows a method of rendering images when the overlapping panorama sphere 400*b* is viewed from points 460 and 462 of view in the present panorama sphere 400*a*. If the images of the overlapping panorama sphere 400*b* are based on computer graphics, objects in the overlapping panorama sphere 400*b* are three-dimensionally disposed and an image to be displayed on a window 470 can be accurately rendered from whichever position in the present panorama sphere 400*a* the overlapping panorama sphere 400*b* is viewed. Furthermore, even when the images of the overlapping panorama sphere 400*b* are shot images, an image to be embedded in the window 470 can be clipped out and generated on the basis of the image data of the overlapping panorama sphere 400*b* according to the location of the point of view in the present panorama sphere 400*a* and the direction of the line of sight.

FIG. 19B shows the image 530 when a user views the overlapping panorama sphere 400*b* on the other side across the door 540 from the location 460 of the point of view. FIG. 19C shows the image 532 when the user views the overlapping panorama sphere 400*b* on the other side across the door 540 from the location 462 of the point of view, which is on the front right side relative to the location 460 of the point of view. In association with the movement of the location of the point of view toward the front right side, the image of the overlapping panorama sphere 400*b* in sight on the opposite side across the door 540 changes to a state in which the more left side is in sight.

FIG. 20 is a flowchart for explaining the procedure of panorama image generation by the panorama image generating device 700 of the present embodiment.

The location-and-posture acquirer 730 acquires the location of the point of view and the direction of the line of sight about a user who wears the head-mounted display 100 (S10). The translational movement detector 782 detects whether the location of the point of view has translationally moved (S12). If a change in the location of the point of view is within a predetermined threshold (N of S12), the translational movement detector 782 deems that the location of the point of view has not translationally moved, and the processing proceeds to a step S22. The panorama image processor 750 clips out, from the panorama image of the present panorama sphere, an image as viewed in the direction of the line of sight from the panorama center with a predetermined angle of view (S22) to generate an image to be displayed on the head-mounted display 100, followed by return to the step S10.

If the change in the location of the point of view surpasses the predetermined threshold (Y of S12), the translational movement detector 782 checks whether the location of the point of view exists in the present panorama sphere (S14). If the distance from the center of the present panorama sphere to the location of the point of view is equal to or shorter than the radius of the present panorama sphere (Y of S14), subsequently the panorama sphere switching section 784 checks whether the location of the point of view exists in a panorama sphere that is so disposed as to overlap with the present panorama sphere (S15). If the location of the point of view exists in the present panorama sphere and exists in any overlapping panorama sphere (Y of S15), the embedded image generator 786 selectively uses either an image of the present panorama sphere or an image of the overlapping panorama sphere, or executes blending processing in which both images are weighted and synthesized (S23), followed by return to the step S10.

If the location of the point of view exists in the present panorama sphere but exists in none of the overlapping panorama spheres (N of S15), the translational movement detector 782 obtains a pseudo rotational angle about the panorama center from the location of the point of view and the direction of the line of sight in order to implement the pseudo translational movement (S24). Next, the panorama image processor 750 clips out an image as viewed in the direction of the pseudo rotational angle from the panorama center with a predetermined angle of view from the panorama image of the present panorama sphere (S26), and the correction processor 780 carries out keystone correction on the clipped image to convert the image to an image based on the pseudo translational movement (S28) and thereby generate an image to be displayed on the head-mounted display 100, followed by return to the step S10.

If, in the step S14, the distance from the center of the present panorama sphere to the location of the point of view surpasses the radius of the present panorama sphere (N of S14), the panorama sphere switching section 784 checks whether the location of the point of view exists in any overlapping panorama sphere (S16). If the location of the point of view exists in any overlapping panorama sphere (Y of S16), the panorama sphere switching section 784 switches the panorama sphere of the processing target from the present panorama sphere to the overlapping panorama sphere (S18). After the step S18, the processing proceeds to the steps S24 to S28 and the deviation between the panorama center and the location of the point of view in the overlapping panorama sphere is subjected to correction processing based on the pseudo translational movement.

If the location of the point of view exists in none of the overlapping panorama spheres in the step S16 (N of S16), the user is notified of a warning indicating that forwarding to the location is impossible (S20), followed by return to the step S10.

The present disclosure is described above on the basis of the embodiment. The embodiment is exemplification and it is to be understood by those skilled in the art that various modification examples can be made regarding combinations of the respective constituent elements and the respective processing processes in the embodiment and such modification examples are also included in the scope of the present disclosure. Such modification examples will be described below.

In the above description, the embodiment example in which a panorama image is displayed on a head-mounted display is described. However, the image generating method of the present embodiment may be applied also to the case of displaying a panorama image on a normal desktop or wall-hung display that is not mounted on the head, to provide a panorama viewer that allows walk-through in a space of plural panorama spheres disposed in a world coordinate system.

The panorama image is not limited to an image shot by an omnidirectional shooting system and may be an image shot by using a fisheye lens or an image obtained by synthesizing plural images shot by a normal digital camera with variation in the shooting direction. Furthermore, the panorama image does not need to be an omnidirectional image and it suffices for the panorama image to be a wide viewing angle image. Moreover, the panorama image is not limited to an actually-shot image and may be a still image or a moving image generated by computer graphics.

The present disclosure contains subject matter related to that disclosed in Japanese Priority Patent Application JP 2014-191775 filed in the Japan Patent Office on Sep. 19, 2014, the entire content of which is hereby incorporated by reference.

What is claimed is:
1. An image generating device comprising:
a storage section configured to store images of surrounding spaces, with each image centered at a different fixed point;
a detecting section configured to detect translational movement on the basis of a first location to a second location of a point of view,
wherein the first location and the second location are at locations different than the fixed points;
an image processor configured to acquire an image of a displaying target by clipping out part of the image of the surrounding space centered at a first fixed point from the different fixed points nearest the first location;
a switching section configured to make switching to an image of the surrounding space centered at a second fixed point closest to the second location of the point of view after translational movement if (a) the second location is nearer the second fixed point than the first fixed point, and (b) the first fixed point and the second fixed point are so disposed such that the surrounding spaces centered at the first fixed point and the second fixed point overlap with each other in a world coordinate system in which the point of view moves and translational movement is detected by the detecting section; and a synthesizing section configured to clip out part of the image of the surrounding space centered at a third fixed point different from the first fixed point and the second fixed point on the basis of the location of the point of view and the direction of the line of sight and synthesize the clipped part as an embedded image within the image of the displaying target, wherein the embedded image is displayed using an indicator image different than the embedded image when a location of the point of view is greater than a predetermined distance from the embedded image, and wherein the embedded image is displayed as the embedded image when a location of the point of view is less than the predetermined distance from the embedded image.

2. The image generating device according to claim 1, further comprising a correction processor configured to correct the image of the displaying target to generate an image based on pseudo translational movement if translational movement is detected by the detecting section.

3. The image generating device according to claim 1, wherein the switching section causes displaying of a warning indicating that translational movement is impossible if the second location of the point of view after translational movement exists in none of the surrounding spaces centered at the fixed points.

4. The image generating device according to claim 1, wherein the synthesizing section generates the embedded image by selecting any of images of surrounding spaces centered at a plurality of fixed points or synthesizing the images of the surrounding spaces centered at the plurality of fixed points in a region in which the surrounding spaces centered at the plurality of fixed points overlap with each other.

5. The image generating device according to claim 4, wherein if translational movement of the point of view moves through an area occupied by the indicator image to a location nearer to the third fixed point than the second fixed point or the first fixed point, the switching section makes switching to the image of the surrounding space centered at the third fixed point, displayed in the embedded image.

6. An image generating method comprising:

detecting translational movement on the basis of a location of a point of view moving from a first location to a second location;

acquiring an image of a displaying target by clipping out, from a memory that stores images of surrounding spaces, each image of surrounding spaces centered at a different fixed point, part of the image of the surrounding space centered at a first fixed point from the different fixed points nearest the first location;

making switching to the image of the surrounding space centered at a second fixed point different than the first fixed point closest to the second location of the point of view after translational movement if (a) the second location is nearer the second fixed point than the first fixed point, and (b) the first fixed point and second fixed are so disposed such that the surrounding spaces centered at the first fixed point and the second fixed point overlap with each other in a world coordinate system in which the point of view moves and translational movement is detected by the detecting, wherein the first location and the second location are at locations different than the fixed points;

clipping out part of the image of the surrounding space centered at a third fixed point different from the first fixed point and the second fixed point on the basis of the location of the point a view and the direction of the line sight; and synthesizing the dipped part as an embedded image within the image of the displaying target, wherein the embedded image is displayed using an indicator image different than the embedded image when a location of the point of view is greater than a predetermined distance from the embedded image, and wherein the embedded image is displayed as the embedded image when a location of the point of view is less than the predetermined distance from the embedded image.

7. A non-transitory computer readable medium having stored thereon a program for a computer, the program comprising:

detecting translational movement on the basis of a location of a point of view moving from a first location to a second location;

acquiring an image of a displaying target by clipping out, from a memory that stores images of surrounding spaces, each image centered at a different fixed point, part of the image of the surrounding space centered at a first fixed point from the different fixed points nearest the first location; and making switching to the image of the surrounding space centered at a second fixed point different than the first fixed point closest to the second location of the point of view after translational movement if (a) the second location is nearer the second fixed point than the first fixed point, and (b) the first fixed point and second fixed are so disposed such that the surrounding spaces centered at the first fixed point and the second fixed point overlap with each other in a world coordinate system in which the point of view moves and translational movement is detected by the detecting, wherein the first location and the second location are at locations different than the fixed points;

clipping out part of the image of the surrounding space centered at a third fixed point different from the first fixed point and the second fixed point on the basis of the location of the point of view and the direction of the line of sight; and synthesizing the clipped part as an embedded image within the image of the displaying target, wherein the embedded image is displayed using an indicator image different than the embedded image when a location of the point of view is greater than a predetermined distance from the embedded image, and wherein the embedded image is displayed as the embedded image when a location of the point of view is less than the predetermined distance from the embedded image.

* * * * *